(12) United States Patent
Dayrell

(10) Patent No.: US 10,714,273 B2
(45) Date of Patent: Jul. 14, 2020

(54) GRAPHENE SUPERCAPACITOR DESIGN AND MANUFACTURE

(71) Applicant: Ivan Araujo Dayrell, Belo Horizonte MG (BR)

(72) Inventor: Ivan Araujo Dayrell, Belo Horizonte MG (BR)

(*) Notice: Subject to any disclaimer, the term of this patent is extended or adjusted under 35 U.S.C. 154(b) by 0 days.

(21) Appl. No.: 16/448,003

(22) Filed: Jun. 21, 2019

(65) Prior Publication Data

US 2019/0333711 A1    Oct. 31, 2019

Related U.S. Application Data

(62) Division of application No. 15/601,106, filed on May 22, 2017, now Pat. No. 10,373,765.

(60) Provisional application No. 62/340,119, filed on May 23, 2016.

(51) Int. Cl.
| | | |
|---|---|---|
| *H01G 11/36* | (2013.01) | |
| *H01G 11/32* | (2013.01) | |
| *H01G 11/56* | (2013.01) | |
| *H01G 11/10* | (2013.01) | |
| *H01G 11/58* | (2013.01) | |
| *H01G 11/86* | (2013.01) | |

(52) U.S. Cl.
CPC ............ *H01G 11/36* (2013.01); *H01G 11/10* (2013.01); *H01G 11/32* (2013.01); *H01G 11/56* (2013.01); *H01G 11/58* (2013.01); *H01G 11/86* (2013.01); *Y02E 60/13* (2013.01)

(58) Field of Classification Search
CPC ........ H01G 11/36; H01G 11/10; H01G 11/58; H01G 11/86
See application file for complete search history.

(56) References Cited

U.S. PATENT DOCUMENTS

| | | | |
|---|---|---|---|
| 10,373,765 B2 * | 8/2019 | Dayrell | ................ H01G 11/36 |
| 2014/0227548 A1 * | 8/2014 | Myrick | ................ C06B 45/30 |
| | | | 428/570 |

* cited by examiner

*Primary Examiner* — Seahvosh Nikmanesh
(74) *Attorney, Agent, or Firm* — Z IP Law PLLC

(57) ABSTRACT

Improvements in design and manufacturing techniques to produce a graphene based prismatic supercapacitor of very high capacitance with very high energy density storage able to outperform and replace the cutting edge batteries available in the market today.

12 Claims, 29 Drawing Sheets

Figure 3:
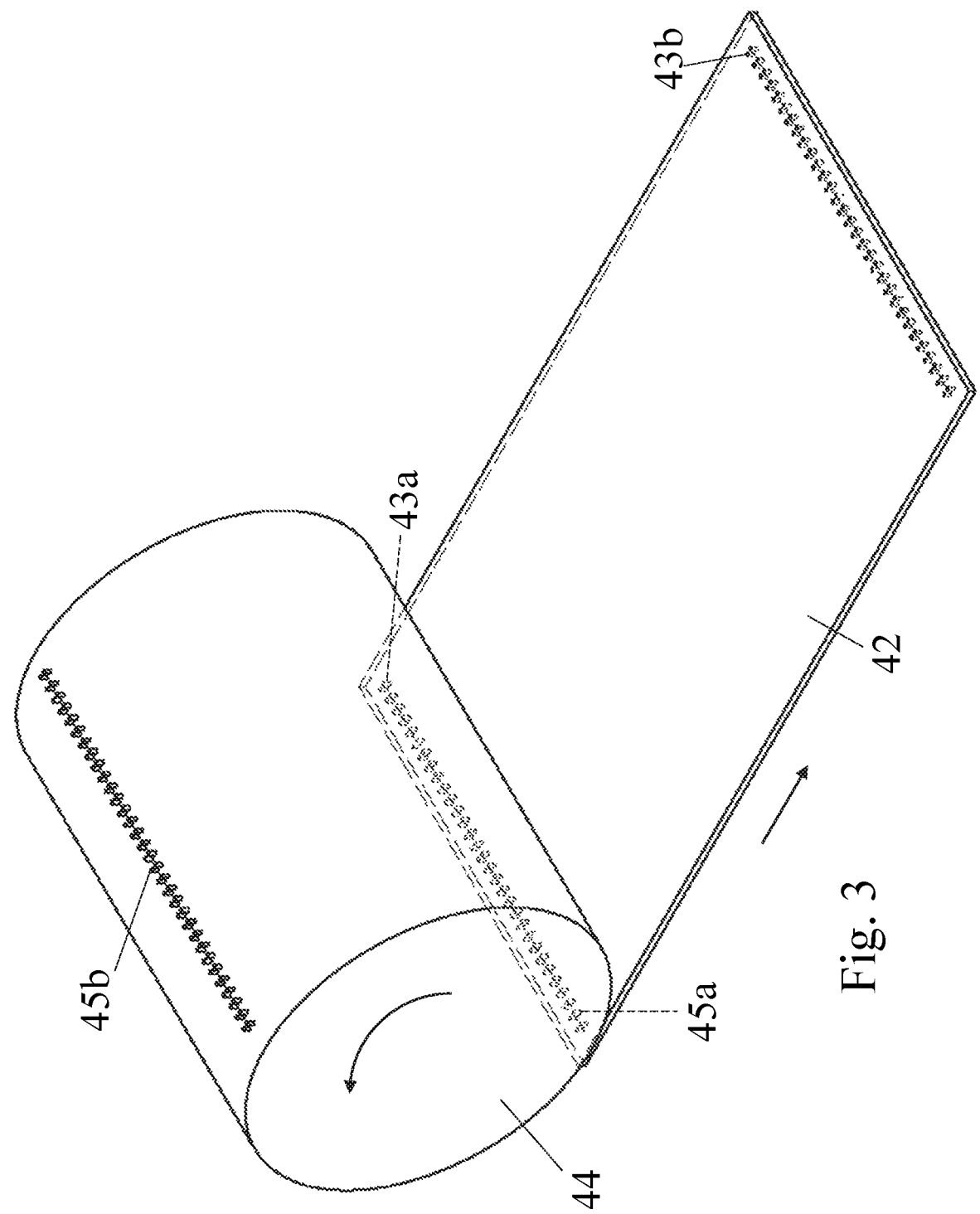

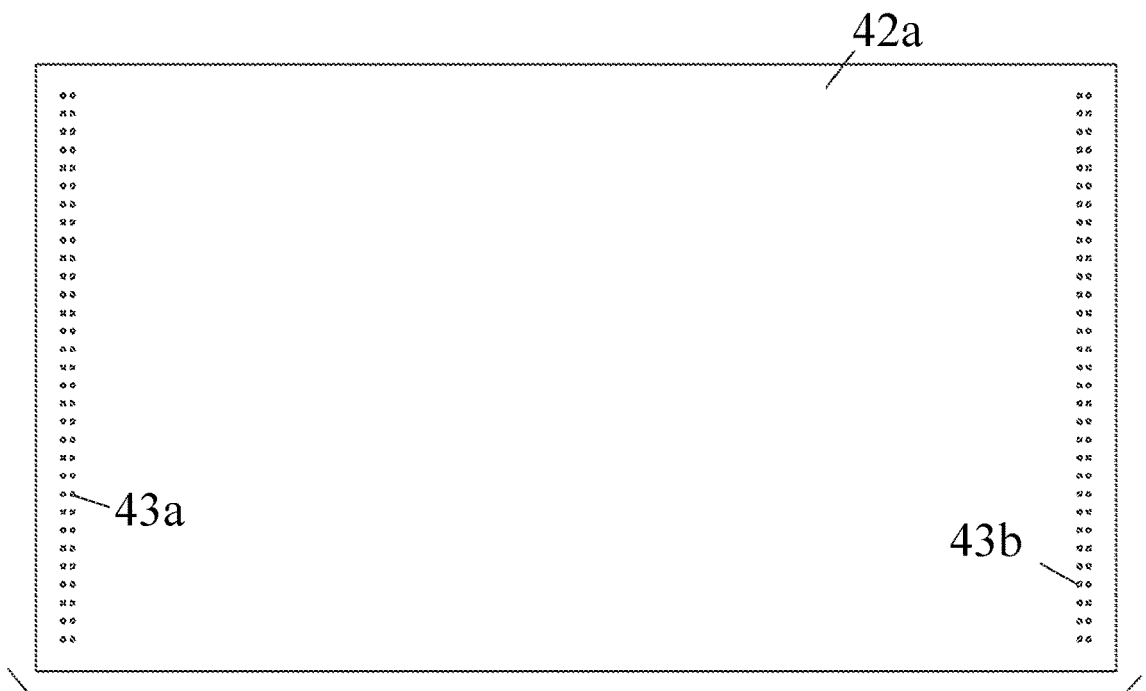
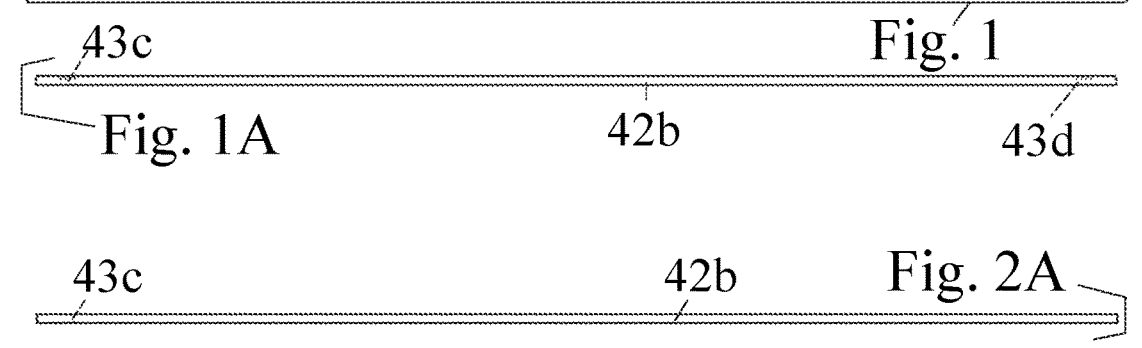
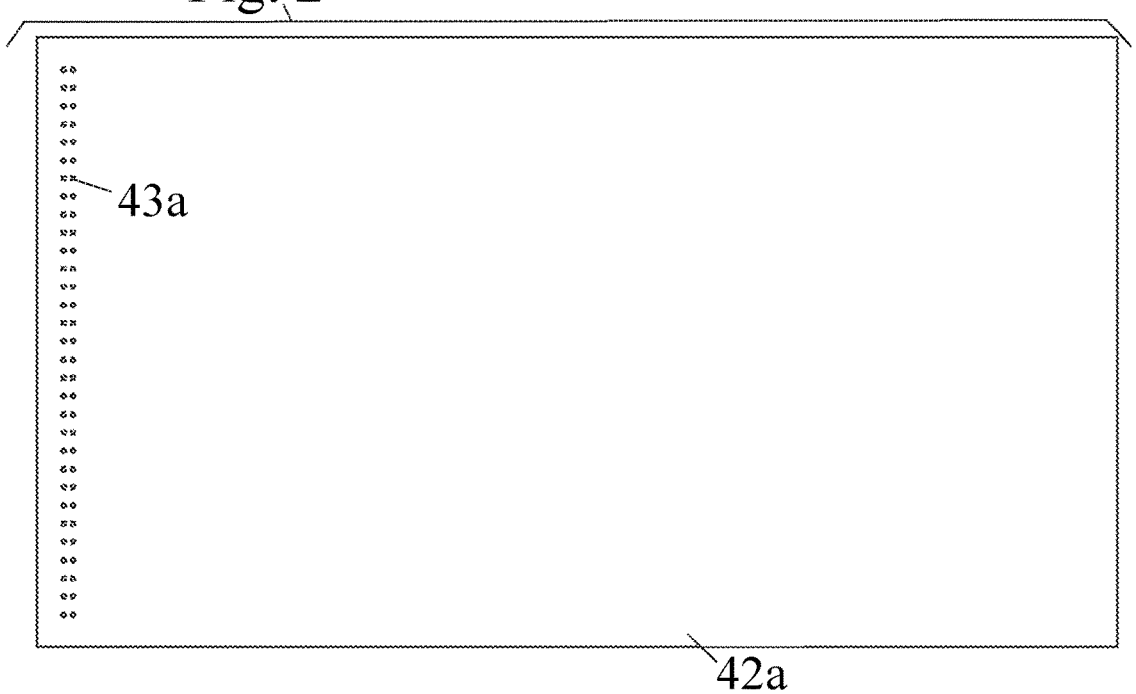

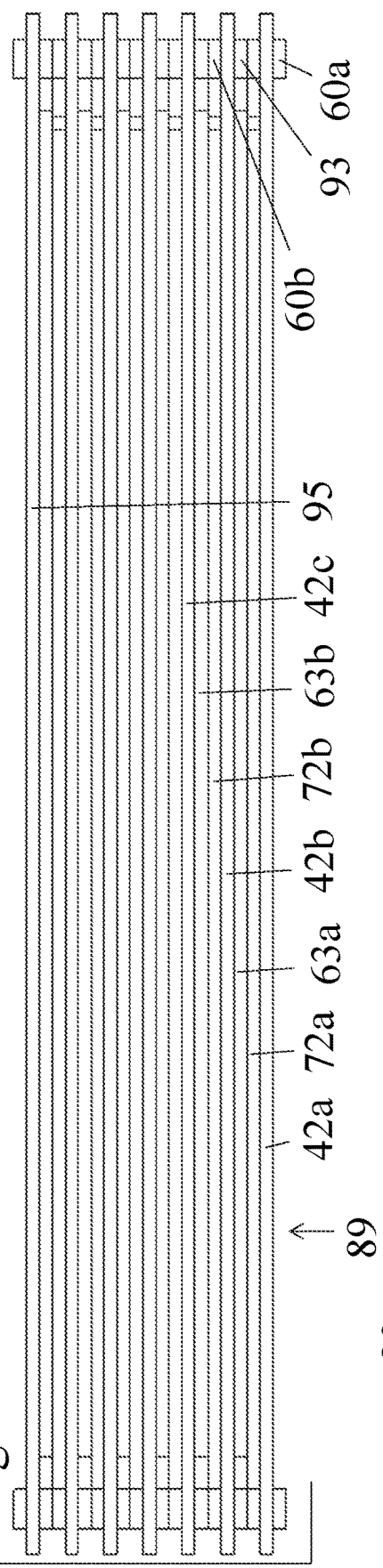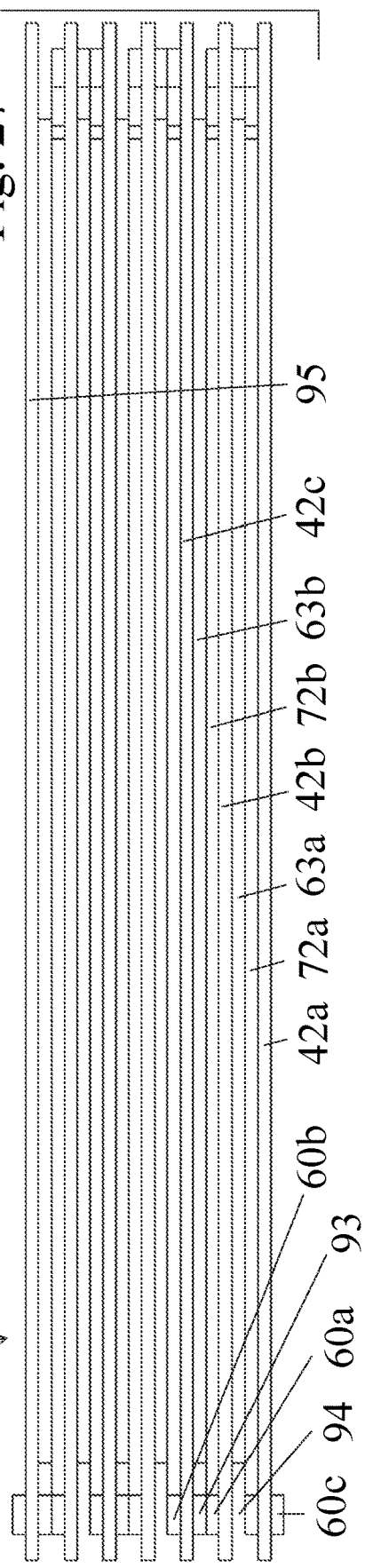

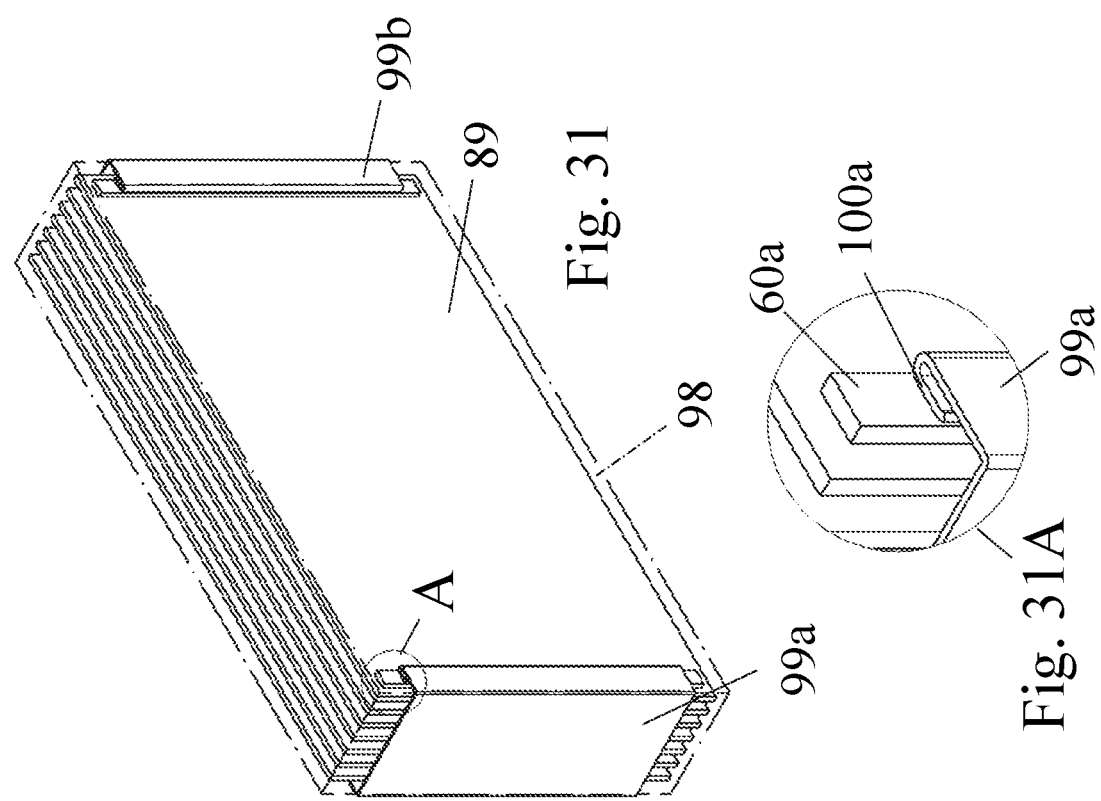
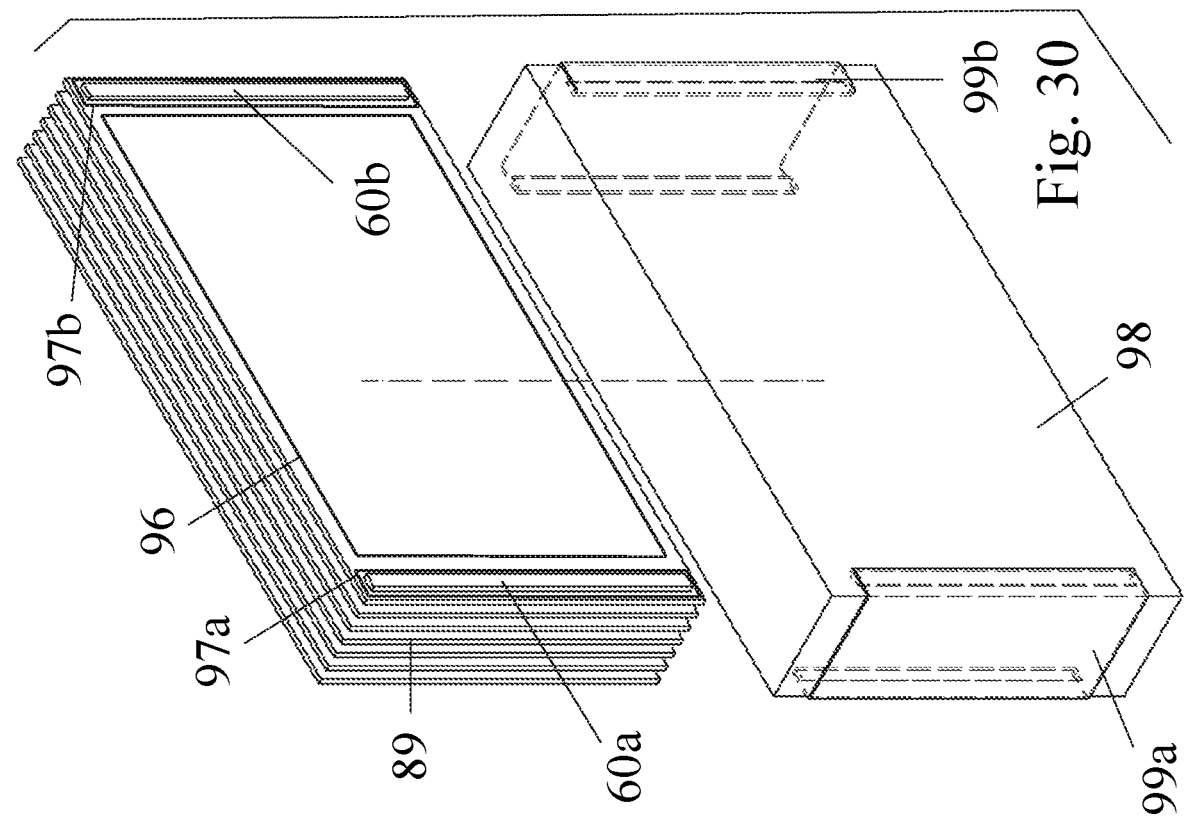

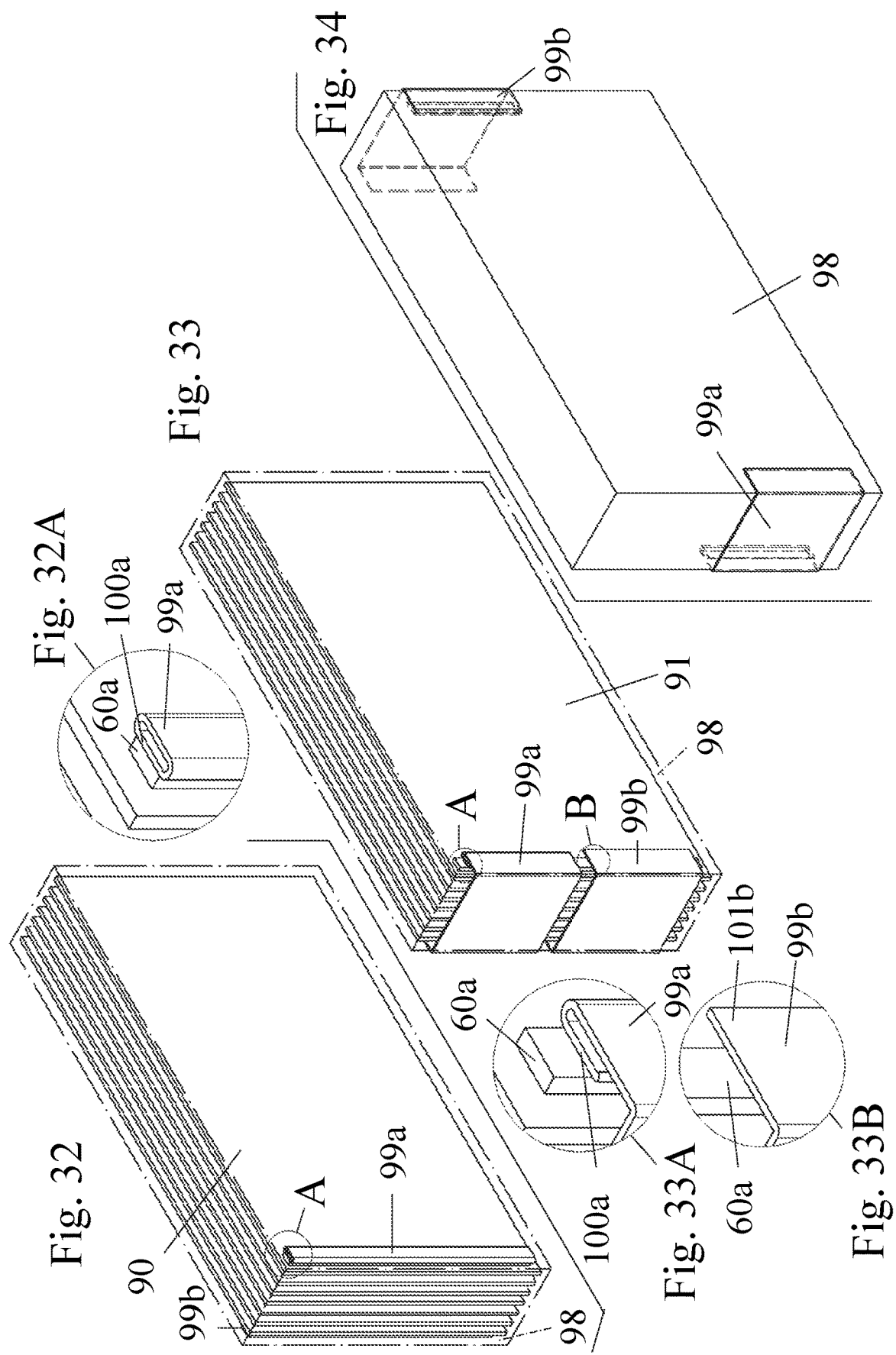

GRAPHENE SUPERCAPACITOR DESIGN AND MANUFACTURE

CROSS-REFERENCE TO RELATED APPLICATIONS

This application is a divisional patent application of U.S. patent application Ser. No. 15/601,106 filed on May 22, 2017 that claims the benefit of U.S. Provisional Patent Application No. 62/340,119 filed May 23, 2016 entitled GRAPHENE SUPERCAPACITOR DESIGN AND MANUFACTURE which is hereby incorporated herein by reference in the entirety.

FEDERALLY SPONSORED RESEARCH

Not Applicable

SEQUENCE LISTING OR PROGRAM

Not Applicable

FIELD OF THE INVENTION

The present invention is related to improvements in design and manufacturing techniques to produce a graphene based prismatic supercapacitor of very high capacitance with very high energy density storage able to outperform and replace the cutting edge batteries available in the market today.

BACKGROUND

Graphene and other nano technology carbon based materials have attracted a lot of attention recently in a lot of areas. Specifically, in battery and capacitor technology, they provide a means to produce cheap conductors of very high conductance that dramatically increase surface area available for electrostatic charge accumulation in a supercapacitor.

Many research lines are seeking ways to further improve surface area, energy density and power density with promising results. Once fully developed into a mature technology, graphene supercapacitors offer the promise of affordable, clean and recyclable devices able to vastly outperform the best batteries available in the market today. To achieve that goal though, there are still many aspects of the design and manufacturing of supercapacitors that need improvement.

PRIOR ART

There have been many approaches to the construction of carbon based supercapacitors. The basic concept is very straightforward. Two carbon based electrodes are put in contact with a suitable electrolyte that accumulates charge via an electrostatic process. The advantage of using carbon is that this is a cheap, readily available material that is extremely versatile and can be made into electrodes with very high surface area relatively easily. Furthermore, carbon remains stable when subjected to a wide range of electrolytes allowing for a wider range of options in design.

Activated carbon, graphene, carbon nanotubes and other carbon based materials have been tried and results have been presented by several individuals and research institutions. So far most reports seem to indicate that for a given electrolyte, reducing the size of the electrodes so that a higher number of electrodes can fit into a given volume increases the energy density of the device and increasing the surface area for a given electrode size increases the power density.

As a result, activated carbon has been proposed as a convenient material since it has a very high surface area with respect to its volume and is very cheap to obtain and use. Activated carbon has the disadvantage though of being harder to morph into small consistent electrodes that will remain stable during the lifetime of the device. Graphene offers the advantage of potentially higher surface area with respect to volume and the possibility of producing very small electrodes. However, graphene is more expensive to produce and more complicated to manipulate than activated carbon.

There are many companies already manufacturing carbon based supercapacitors that offer good performance for specific applications. However, until now the commercial devices have been unable to deliver sufficient energy and power densities at an affordable price to be considered for replacement of the cutting edge lithium ion batteries available in the market.

The main reason for the unsatisfactory performance is the construction design used by most existing supercapacitors that are constructed using a stack of pairs of solid plates made of carbon (graphene, activated carbon, etc.), each plate producing an electrode. Each pair of plate electrodes is separated by an insulator to prevent short circuits should the plates touch. This design relies solely on the high surface area an individual plate has due to the nature of the carbon electrode that is a function of the plate area. Limitations regarding the structural strength of the plates require them to have a minimum thickness and the need of an insulator sheet between each pair of plate electrodes further limits the total surface area that is made available for a given volume (mass) resulting in poor energy density.

The technology is advancing at a rapid pace and it is reasonable to assume that in the near future supercapacitors will improve to the point that they will displace batteries in a very wide range of applications. Improved manufacturing techniques using activated carbon, graphene or other materials such as carbon nanotubes or mixtures of more than one type of material may in the future provide a better compromise for energy density, power density and cost.

Advantages

The proposed invention has been designed considering multiple aspects of the production of a graphene or activated carbon supercapacitor and offers the following advantages:

1) Massive increase in available surface area of the electrodes by morphing them into lines with very small width and relatively high height separated by very small gaps instead of a simple solid plate resulting in high specific capacitance;

2) Increase in energy density by allowing the reliable construction of the electrodes using thin substrates;

3) Increase in power density by using large terminals and avoiding damage to the microstructure of the electrodes sometimes caused by steps of other unperfected manufacturing processes;

4) Simplification of the manufacturing process, allowing the electrodes and electrolyte to be printed even at very small sizes;

5) Simplification of the packaging, allowing the several printed sheets that constitute a particular device to be simply stacked and encased in a simple process that does not require high precision positioning nor delicate tasks;

6) Significant cost reduction in the production of the devices; and

7) Enable the use of special inks made of graphene, activated carbon, carbon nanotubes or a mixture of two or more of these components or other materials that may be determined in the future to be advantageous to use.

SUMMARY OF THE INVENTION

One object and advantage of the proposed invention is the printing of the supercapacitor individual elements in suitable sheets so that these sheets can be easily stacked saving time and money in the assembly process.

Another object and advantage of the proposed invention is innovative nanolinear patterns and shapes that may be printed or formed using other manufacturing processes to produce individual elements of the supercapacitor that provide improvements in attainable capacitance, improvements in attainable energy density, improvements in attainable power density, improvements in electrical insulation or maximum break down voltage, improvements in charge and discharge performance, improvements in mechanical resistance to shock and improvements in the device useful life.

Another object and advantage of the proposed invention is the manufacturing process that allows existing printing equipment normally used to produce printed plastic films for packaging or similar applications to print the nanolinear patterns and shapes necessary to produce a supercapacitor. The existing printing equipment maximum resolution is typically 5 microns or more, meaning that features smaller than that cannot be reliably printed. The manufacturing method of the present invention, combined with the proposed nanolinear patterns and shapes allows the existing printing equipment to be tuned so that it can print reliably and cheaply features smaller than 5 microns, reaching 1 micron or less.

Another object and advantage of the proposed invention is a manufacturing process using photoresist that allows affordable and reliable printing of even smaller electrodes than the printing process can produce. The photoresist process can achieve a consistent resolution of 50 nanometers producing electrodes that are sufficiently precise and uniform to achieve high energy densities at the same time avoiding short circuits or performance degradation of the assembled device due to non-uniformities among the several individual sheets used in its construction.

Another object and advantage of the proposed invention is the possibility to use special inks composed of graphene, graphene oxide, activated carbon, carbon nanotubes or a mixture of two or more of these components or other components that may be determined in the future to be advantageous to use.

Another object and advantage of the present invention is the containment process used in the printing process that uses high viscosity inks that are cured with ultraviolet light or heat to print the small features of the nanolinear patterns and shapes of the present invention along the direction of printing. As all small printed lines within the nanolinear patterns are parallel to the direction of printing, the viscous ink will preferable flow in the direction of printing and eventual spills combine into the same line being printed. Ultraviolet light or heat can be used to quickly dry the ink that has just been deposited into the substrate avoiding spills perpendicular to the direction of printing that would cause parallel lines to touch producing short circuits.

Another object and advantage of the present invention is the containment process used in a photoresist process that is suitable for printing at nanometer scales where high viscosity inks do not produce a good result. The ink is applied during the printing process into gaps left by removed areas of the photoresist. The ink cannot fill the spaces still covered by the photoresist that work as barriers to the coating of the ink on the substrate or element sheet. As a result, the ink can be made with tiny particles using a binder of low viscosity or may be made with a binder that will not harden unless submitted to a suitable curing process. This allows the ink to reach all spots intended to be covered without the risk of leaks or spills that could lead to short circuits. The ink can be submitted to a curing process or left to dry on its own before the physical barrier of the photoresist is removed so that the electrolyte can be applied or deposited only in the areas previously occupied by the photoresist.

Another object and advantage of the proposed invention is the manufacturing process that allows the affordable and reliable assembly of sheets printed using the printing or photoresist process into stacks and then into devices with the desired electric characteristics.

Another object and advantage of the present invention is the creation of electrical contact points along the edges of each substrate or element sheet to enable conductivity simply by stacking the sheets.

Another object and advantage of the present invention is an increase in the number of capacitors within a given area through the formation physical barriers that contain and provide for increases in the thickness of the graphene ink thereby increasing the surface area of the electrodes.

The present invention is related to a manufacturing process for the production of supercapacitors having increased energy density, comprising perforating a series of orifices on an element sheet; layering the element sheet with photoresist on one or both sides; exposing portions of the photoresist to a light source to remove these portions from the element sheet; printing graphene ink within the remaining portions of the photoresist and through the orifices; printing graphene ink on both sides of the element sheet filling the orifices to create terminals that have a larger size as compared to the remaining portions and to connect both sides of the element sheet; removing remaining portions of photoresist thereby leaving a pattern design; printing electrolyte within the pattern design; and wherein the pattern design forming electrodes having minimal spacing between gaps to increase the energy density within the supercapacitor. The manufacturing process for the production of supercapacitors wherein the minimal gaps between the printed electrodes is less than five microns. The manufacturing process for the production of supercapacitors wherein the minimal gaps between the printed electrodes is between one hundred nano meters to two microns. The manufacturing process for the production of supercapacitors comprising increasing the thickness of the photoresist to increase the depth of the graphene ink layer and the electrolyte layer thereby increasing the energy density of the supercapacitor. The manufacturing process for the production of supercapacitors comprising replacing the graphene ink by an ink composed of a mixture selected from the group consisting of graphene, carbon nanotubes and activated carbon to increase the physical properties of the electrodes by increasing the number of pores into the electrodes thereby increasing the available surface area of the printed electrode and thereby increasing the capacitance and the energy density of the supercapacitor. The manufacturing process for the production of supercapacitors comprising a pattern design having physical barriers that extend linearly in the direction of printing. The supercapacitor produced by the process of manufacturing. The manufacturing process for the production of supercapacitors comprising a pattern design that maximizes the number of individual capacitors that can be printed within the element sheet. The manufacturing process for the production of supercapacitors comprising individual capacitors connected in parallel. The manufacturing process for the production of supercapacitors comprising individual capacitors connected in series. The manufacturing process for the production of supercapacitors comprising individual capacitors connected in series and parallel. The manufacturing process for the production of supercapacitors comprising a pattern design comprising individual fringes of the electrode terminating in a curved end with a matching curved contour on an adjacent electrode. The manufacturing process for the production of supercapacitors comprising stacking element sheets in parallel to increase the capacitance and the current of the supercapacitor. The manufacturing process for the production of supercapacitors comprising stacking element sheets in series to increase the voltage of the supercapacitor. The manufacturing process for the production of supercapacitors comprising stacking element sheets in series and parallel to increase the voltage, capacitance and current of the supercapacitor.

The present invention is further related to an increased energy density supercapacitor, comprising a pattern design developed using a photoresist process; graphene ink printed within the pattern design; electrolyte printed within and covering the pattern design; and wherein the individual capacitors dimensions are reduced to fit more capacitors within a given area to form an increased energy density supercapacitor. The increased energy density supercapacitor wherein the minimal dimension of a line of graphene ink printed is less than 5 microns. The increased energy density supercapacitor wherein the minimal dimension of a line of graphene ink printed is between one hundred nano meters and two microns. The increased energy density supercapacitor wherein the supercapacitor may be stacked in parallel to increase capacitance and current. The increased energy density supercapacitor wherein the supercapacitor may be stacked in series to increase voltage. The increased energy density supercapacitor of claim wherein the supercapacitor may be stacked in series and parallel to increase voltage, capacitance and current. The increased energy density supercapacitor wherein the graphene ink is replaced by an ink composed of a mixture selected from the group consisting of graphene, carbon nanotubes and activated carbon to increase the physical properties of the electrodes by increasing the number of pores into the electrodes thereby increasing the available surface area of the printed electrode and thereby increasing the capacitance and the energy density of the supercapacitor.

The present invention is further related to a manufacturing process for the production of thin line supercapacitors having increased energy density, comprising perforating a series of orifices on an element sheet; printing graphene ink on both sides of the element sheet filling the orifices to create terminals that connect both sides of the element sheet; printing graphene ink in a plurality of thin lines perpendicular to the terminals and along the direction of printing; printing electrolyte within the plurality of thin lines; and forming electrodes having minimal spacing between gaps to increase the energy density within the supercapacitors. The manufacturing process for the production of thin line supercapacitors wherein the minimal gaps between printed features is less than ten microns. The manufacturing process for the production of thin line supercapacitors wherein the minimal gaps between printed features is between two hundred nano meters and ten microns. The manufacturing process for the production of thin line supercapacitors comprising printing short thin lines that are in parallel to the plurality of thin lines and that do not connect to the terminals thereby creating additional capacitors in series to increase voltage. The manufacturing process for the production of thin line supercapacitors comprising replacing the graphene ink by an ink composed of a mixture selected from the group consisting of graphene, carbon nanotubes and activated carbon to increase the physical properties of the electrodes by increasing the number of pores into the electrodes thereby increasing the available surface area of the printed electrode and thereby increasing the capacitance and the energy density of the supercapacitor. The supercapacitor produced by the manufacturing process. The manufacturing process for the production of thin line supercapacitors comprising a pattern design formed from the plurality of thin lines that maximizes the number of individual capacitors that can be printed within the element sheet. The manufacturing process for the production of thin line supercapacitors comprising individual capacitors connected in parallel. The manufacturing process for the production of thin line supercapacitors comprising individual capacitors connected in series. The manufacturing process for the production of thin line supercapacitors comprising the individual capacitors connected in series and parallel. The manufacturing process for the production of thin line supercapacitors comprising stacking element sheets in parallel to increase the capacitance and the current of the supercapacitor. The manufacturing process for the production of thin line supercapacitors comprising stacking element sheets in series to increase the voltage of the supercapacitor. The manufacturing process for the production of thin line supercapacitors comprising stacking element sheets in series and parallel to increase the voltage, capacitance and current of the supercapacitor.

These and other features, advantages and improvements according to this invention will be better understood by reference to the following detailed description and accompanying drawings.

DRAWINGS—FIGURES

Various other objects, features and attendant advantages of the present invention will become fully appreciated as the same becomes better understood when considered in conjunction with the accompanying drawings, in which like reference characters designate the same or similar parts throughout the several views, and wherein:

| FIG. | Description | Drawing # |
| --- | --- | --- |
| 1 | Element sheet with perforations for parallel construction top view | 1 |
| 1A | Element sheet with perforations for parallel construction side view | 1 |
| 2 | Element sheet with perforations for series construction top view | 1 |
| 2A | Element sheet with perforations for series construction side view | 1 |
| 3 | Perforation formation method of the element sheet | 2 |
| 4 | Photoresist applied to parallel sheet | 3 |

-continued

| FIG. | Description | Drawing # |
|---|---|---|
| 5 | Image projected into photoresist | 4 |
| 6 | Manufacturing method to project image into photoresist | 5 |
| 7 | Image imprinted into top layer photoresist | 6 |
| 7A | Detail view of photoresist top layer with imprinted image | 6 |
| 8 | Photoresist top layer developed areas removed | 7 |
| 8A | Detail view of photoresist top layer with developed areas removed | 7 |
| 9 | Photoresist bottom layer with developed areas removed | 8 |
| 10 | Ink applied into photoresist top layer removed areas | 9 |
| 10A | Detail view of ink applied into photoresist top layer removed areas | 9 |
| 11 | Ink overflow causing short circuits | 10 |
| 12 | Polishing process to remove ink overflow | 11 |
| 13 | Resulting printed features into element sheet after all photoresist removed | 12 |
| 13A | Detail of printed features | 12 |
| 14 | Electrolyte and glue applied to element sheet | 13 |
| 15 | Printed nanolinear pattern for a full parallel element top view | 14 |
| 15A | Printed nanolinear pattern for a full parallel element for parallel staking side view | 14 |
| 15B | Printed nanolinear pattern for a full parallel element for series stacking side view | 14 |
| 16 | Printed nanolinear pattern for a 2 series element | 15 |
| 17 | Printed nanolinear pattern for a 3 series element | 16 |
| 18 | Printed nanolinear pattern for a 4 series element | 17 |
| 19 | Printed nanolinear pattern for a half full series element | 18 |
| 20 | Printed nanolimear pattern for a full series element | 19 |
| 21 | Thick terminals printed over perforations in direction transversal to printing | 20 |
| 22 | Thin lines printed parallel to direction of printing for a full parallel element | 21 |
| 23 | Thin lines printed parallel to direction of printing for a 2 series element | 22 |
| 24 | Thin lines printed parallel to direction of printing for a 3 series element | 23 |
| 25 | Manufacturing process | 24 |
| 26 | Stack of supercapacitor elements arranged in parallel | 25 |
| 27 | Stack of supercapacitor elements arranged in series | 25 |
| 28 | Stack of supercapacitor elements arranged in 2 series of 3 paralleled elements | 26 |
| 29 | Stack of supercapacitor elements arranged in 3 series of 2 paralleled elements | 26 |
| 30 | Isometric exploded view of supercapacitor unit | 27 |
| 31 | Isometric view of parallel supercapacitor with prismatic case drawn in phantom lines | 27 |
| 31A | Detail view of power lid connection to terminal of parallel supercapacitor | 27 |
| 32 | Isometric view of series supercapacitor with prismatic case drawn in phantom lines | 28 |
| 32A | Detail view of power lid connection to terminal of series supercapacitor | 28 |
| 33 | Isometric view of alternate construction of supercapacitor | 28 |
| 33A | Detail view of power lid connection to terminal of alternate supercapacitor | 28 |
| 33B | Detail view of power lid clearance of alternate supercapacitor | 28 |
| 34 | Isometric view of another alternate construction of supercapacitor | 28 |
| 35 | Cross-sectional view of a portion of the element sheet | 29 |
| 36 | Cross-sectional view of a portion of the photomask | 29 |
| 37 | Standard deposition of ink into a material sheet | 29 |
| 38 | Cross-sectional view of the filling of the photoresist gaps with ink | 29 |
| 39 | Process step of removing the remaining photoresist | 29 |
| 40 | Process step of printing electrolyte | 29 |

DRAWINGS—REFERENCE NUMERALS

| N | Item Name | Shown in FIGS. |
|---|---|---|
| 42 | element sheet | 1 1A 2 2A 3 4 5 6 7 7A 8 8A 9 10 10A 11 12 13 14 15 15A 15B 16 17 18 19 20 21 22 23 24 26 27 28 29 35 36 37 38 39 40 |
| 43 | orifices | 1 1A 2 2A 3 4 8A 9 15 15A 15B 21 35 36 38 39 40 |
| 44 | perforation drum | 3 25 |
| 45 | perforation spikes | 3 |
| 46 | photoresist | 4 5 6 7A 8A 9 10A 11 35 36 |
| 47 | pattern mask | 5 36 |
| 48 | lens | 5 |
| 49 | light source | 5 36 39 |
| 50 | cylindrical pattern mask | 6 |
| 51 | mask gap | 6 |
| 52 | linear light source | 6 |
| 53 | illuminated areas | 7A |
| 54 | removed areas | 8A 9 |
| 55 | cavities | 8A 9 10A 36 |
| 56 | physical barriers | 8A 9 10A 36 38 |
| 57 | printer head | 10 37 38 40 |
| 58 | ink | 10A 11 12 38 39 40 |
| 59 | ink remover | 12 |
| 60 | terminal | 13 14 15 15A 15B 16 17 18 19 20 21 22 23 24 26 27 30 31A 32A 33A 33B |
| 61 | electrode A | 13 15 16 17 18 19 20 |
| 62 | electrode B | 13 15 16 17 18 19 20 |
| 63 | electrolyte | 14 15 15A 15B 26 27 40 |
| 64 | glue strip | 14 15 15A 15B |
| 65 | fringe | 15 16 17 18 19 20 |
| 66 | electrode gap | 15 16 17 18 19 20 |
| 67 | electrode connection | 15 16 17 18 19 20 |
| 68 | electrode connection gap | 15 16 17 18 19 20 |
| 69 | curved end | 15 16 17 18 19 20 22 23 24 |
| 70 | curved contour | 15 16 17 18 19 20 |
| 71 | series electrode | 16 17 18 19 20 |
| 72 | printed layer | 15 15A 15B 26 27 |
| 73 | parallel design | 15 |
| 74 | series 2 design | 16 |
| 75 | series 3 design | 17 |
| 76 | series 4 design | 18 |
| 77 | series half full design | 19 |
| 78 | series full design | 20 |
| 79 | thin line | 22 23 24 |
| 80 | thin line extra run | 22 23 24 |
| 81 | short thin line | 23 24 |
| 82 | sheet heel | 25 |

-continued

| N | Item Name | Shown in FIGS. |
|---|---|---|
| 83 | continuous sheet | 25 |
| 84 | work station | 25 |
| 85 | guide roller | 25 |
| 86 | stacked sheet | 25 |
| 87 | width cut sheet | 25 |
| 88 | length cut sheet | 25 |
| 89 | parallel stack | 26 30 31 |
| 90 | series stack | 27 32 |
| 91 | 2 series 3 parallel stack | 28 33 |
| 92 | 3 series 2 parallel stack | 29 |
| 93 | terminal connection | 26 27 28 29 |
| 94 | series gap | 27 28 29 |
| 95 | cover element | 26 27 28 29 |
| 96 | electrolyte seal | 30 |
| 97 | terminal seal | 30 |
| 98 | case | 30 31 32 33 |
| 99 | device terminal | 30 31 31A 32 32A 33 33A 33B 34 |
| 100 | device connection | 31A 32A 33A |
| 101 | device terminal bypass | 33B |

DETAILED DESCRIPTION

The present invention consists of pattern designs and methods to produce affordable high quality supercapacitors that have high energy density and high power density. The groundbreaking pattern designs of the present invention optimize useable surface area within a substrate by creating linear barriers at distances that are only nanometers apart. The nanolinear pattern designs formed from the linear and other physical barriers once transferred to a suitable substrate are the basic elements to build the supercapacitor. The nanolinear patterns can be made using graphene ink, graphene oxide ink, other inks based on other carbon components such as activated carbon or carbon nanotubes, or using an ink based on a mixture of these components. The linear barriers extend in the direction of applying ink to the substrate and provide for ink to thicken along the linear barriers increasing the height of the ink in relation to the substrate and thereby increasing the surface area of the electrode which provides for increases in energy density and power density of the supercapacitor.

FIG. 1 shows a top view of an element sheet 42a used to manufacture one element of the supercapacitor that is tailored to be used in parallel. In this case, the element sheet 42a is perforated by a series of orifices 43a, 43b on both extremities.

FIG. 1A shows a front view of an element sheet 42b used to manufacture one element of the supercapacitor that is tailored to be used in parallel. In this case, the element sheet 42b is perforated by a series of orifices 43c, 43d on both extremities.

FIG. 2 shows a top view of the element sheet 42a used to manufacture one element of the supercapacitor that will be used in series. In this case, the element sheet 42a is perforated by a series of orifices 43a on only one extremity.

FIG. 2A shows a front view of the element sheet 42b used to manufacture one element of the supercapacitor that will be used in series. In this case, the element sheet 42b is perforated by a series of orifices 43c on only one extremity.

The element sheet 42 is made of a printable isolating material such as acetate or plastic film as thin as practical to avoid surface defects and structural weakness.

FIG. 3 shows an isometric view of a perforation drum 44 that can be used to produce the orifices 43a and 43b into the element sheet 42. The perforation drum 44 has a series of perforation spikes 45a and 45b that may be heated for better results. As the perforation drum 44 rotates in the direction of the curved arrow, the element sheet 42 advances in synchronicity in the direction of the straight arrow, the perforation spikes 45a and 45b produce the orifices 43a and 43b in the intended positions in the element sheet.

Figure 4:
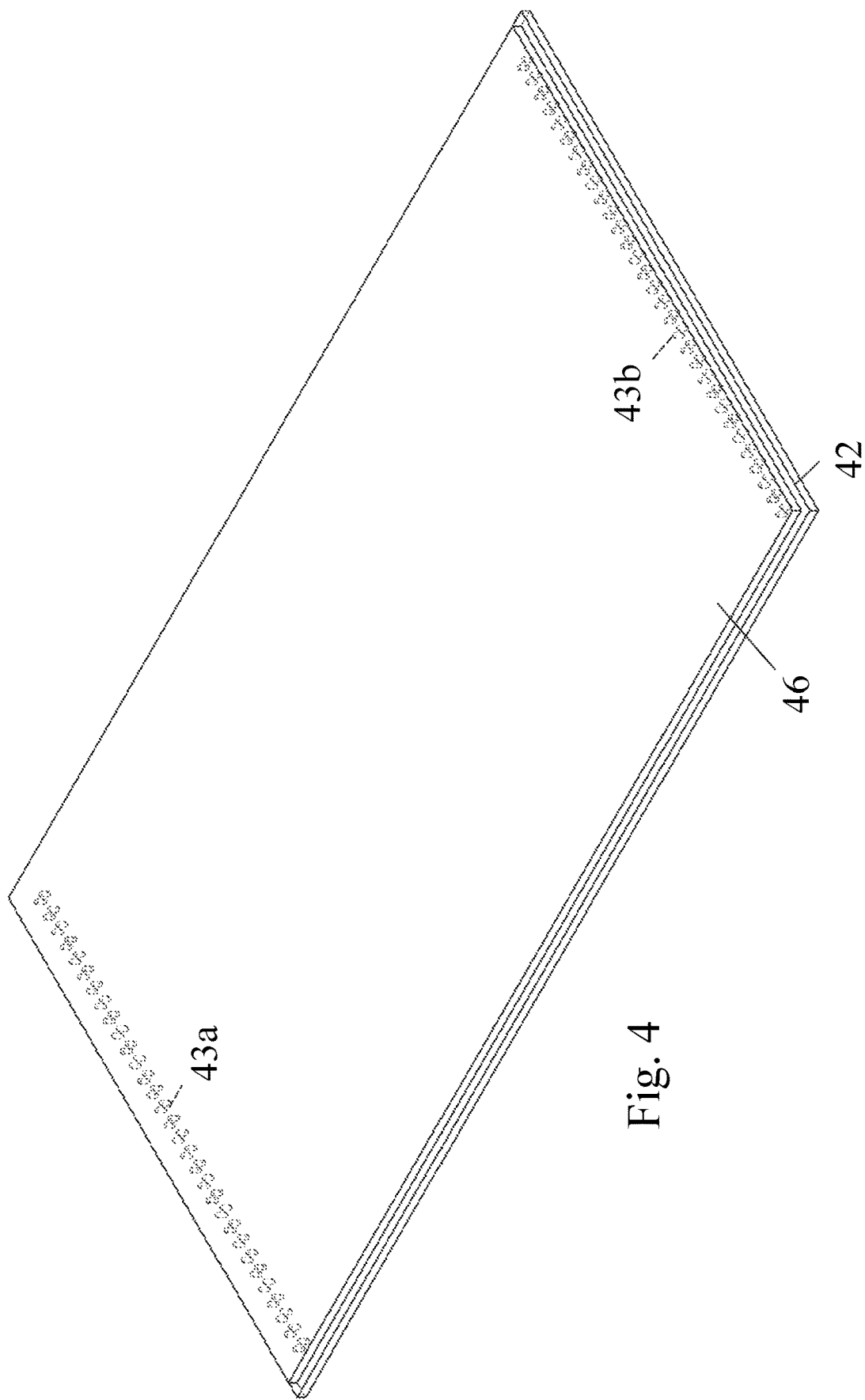

FIG. 4 shows an isometric view of the element sheet 42 coated with a layer of a photoresist 46 that is used to allow the printing or other process of application of the conductors on a very small scale thereby providing improvements in the performance of the supercapacitor. The orifices 43a, 43b are visible in dashed lines.

Figure 5:
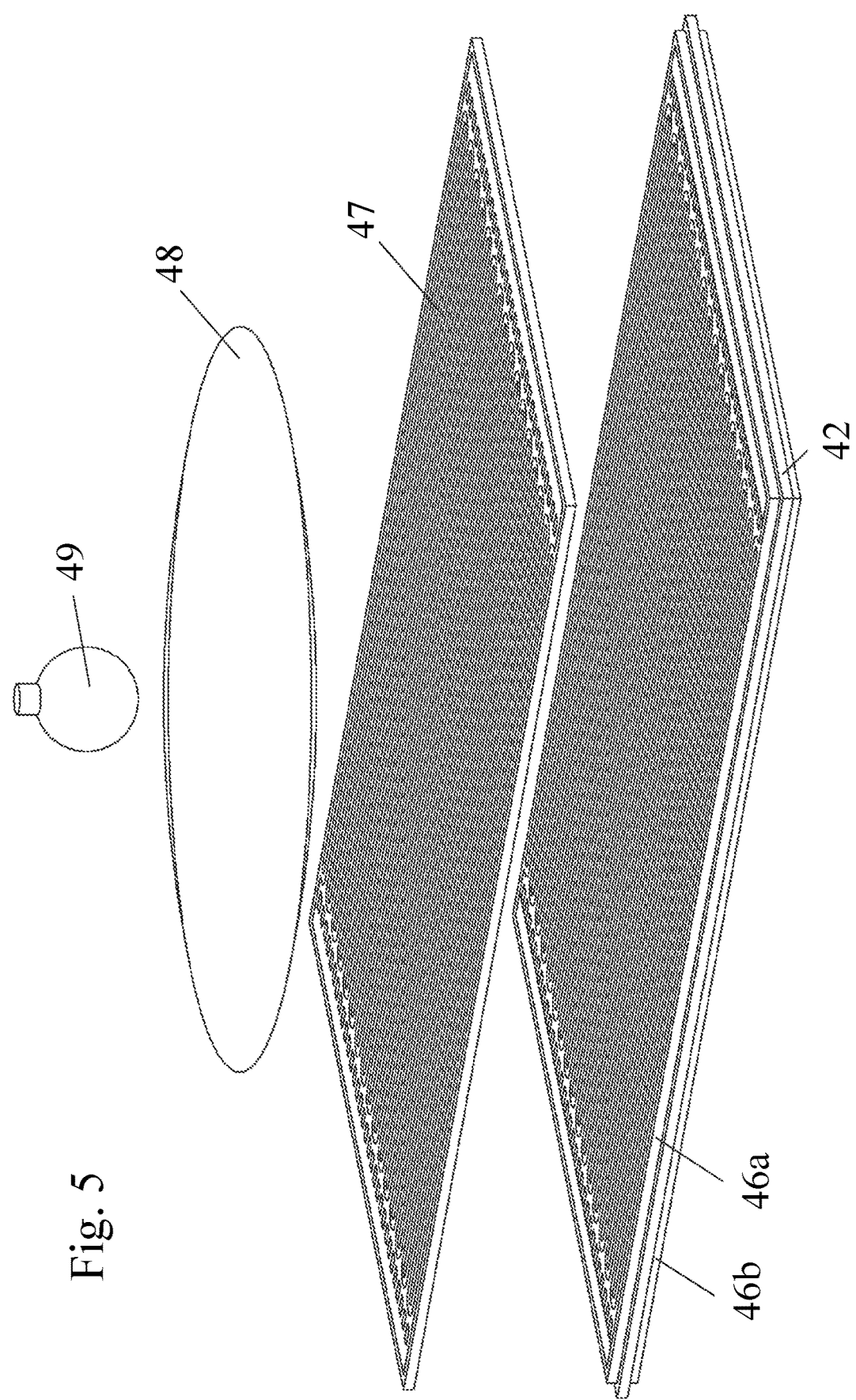

FIG. 5 shows an isometric view of an apparatus that may be used to sensitize the photoresist 46a and 46b that has been applied or deposited on both sides of the element sheet 42. A light source 49 produces a light of adequate wavelength that goes through a lens 48 or an adequate apparatus to illuminate a pattern mask 47 having the linear and physical barriers to form the unique nanolinear pattern designs. The nanolinear pattern design image is produced on the surface of the element sheet 42 to sensitize the photoresist. The process is repeated for both sides of the element sheet.

Figure 6:
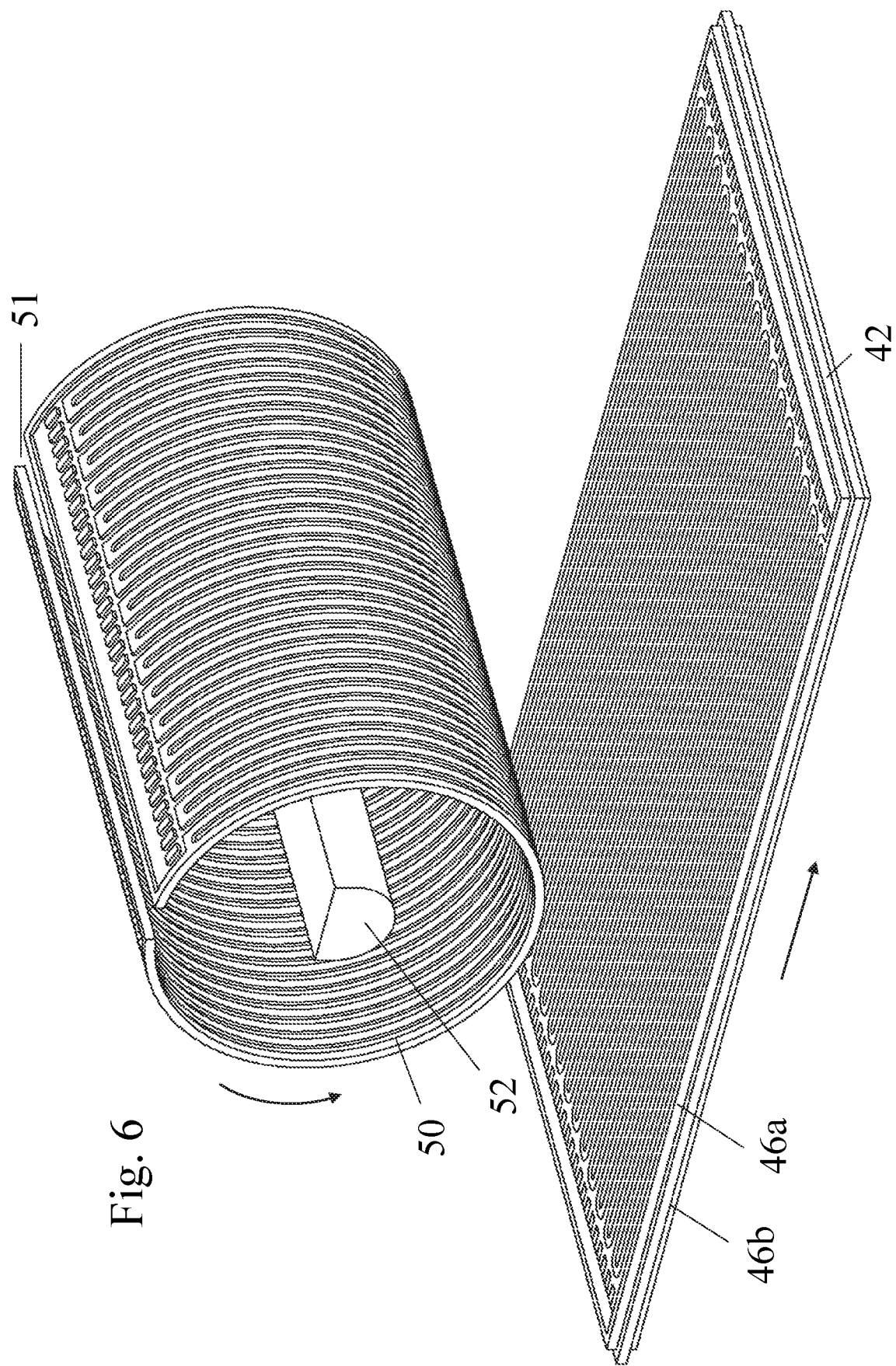

FIG. 6 shows an isometric view of another apparatus that is more adequate for mass production that may be used to sensitize the photoresist 46a and 46b that has been deposited into both sides of the element sheet 42. A linear light source 52 produces a focused and collimated light of adequate wavelength that illuminates a cylindrical pattern mask 50 producing a dynamic image of the nanolinear pattern design into the surface of the element sheet 42. As the cylindrical pattern mask 50 rotates in the direction of the curved arrow, the element sheet 42 advances in synchronicity in the direction of the straight arrow, sensitizing the photoresist as it moves beneath the cylindrical pattern mask 50. A mask gap 51 generates a gap between two consecutive element sheets so they can later on be cut apart. The process is repeated for both sides of the element sheet.

Figure 7:
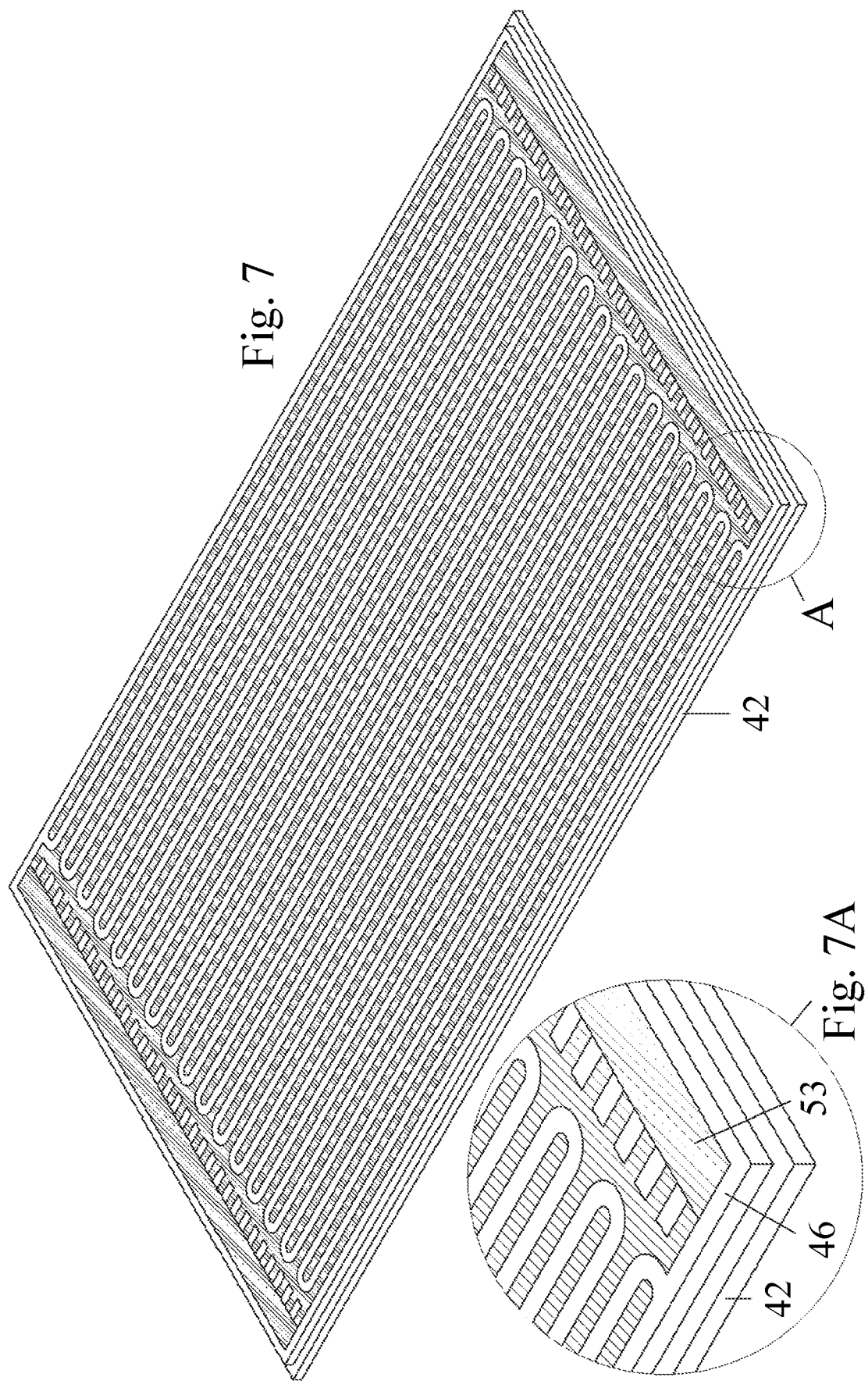

FIG. 7 shows an isometric view of the element sheet 42 coated with the photoresist that has been sensitized to create a desired nanolinear pattern design of the present invention that will be created in the sheet.

Detail FIG. 7A shows a series of illuminated areas 53 of the sensitized photoresist 46 to produce the desired pattern (in hatched lines) that will be created in the element sheet 42.

Figure 8:
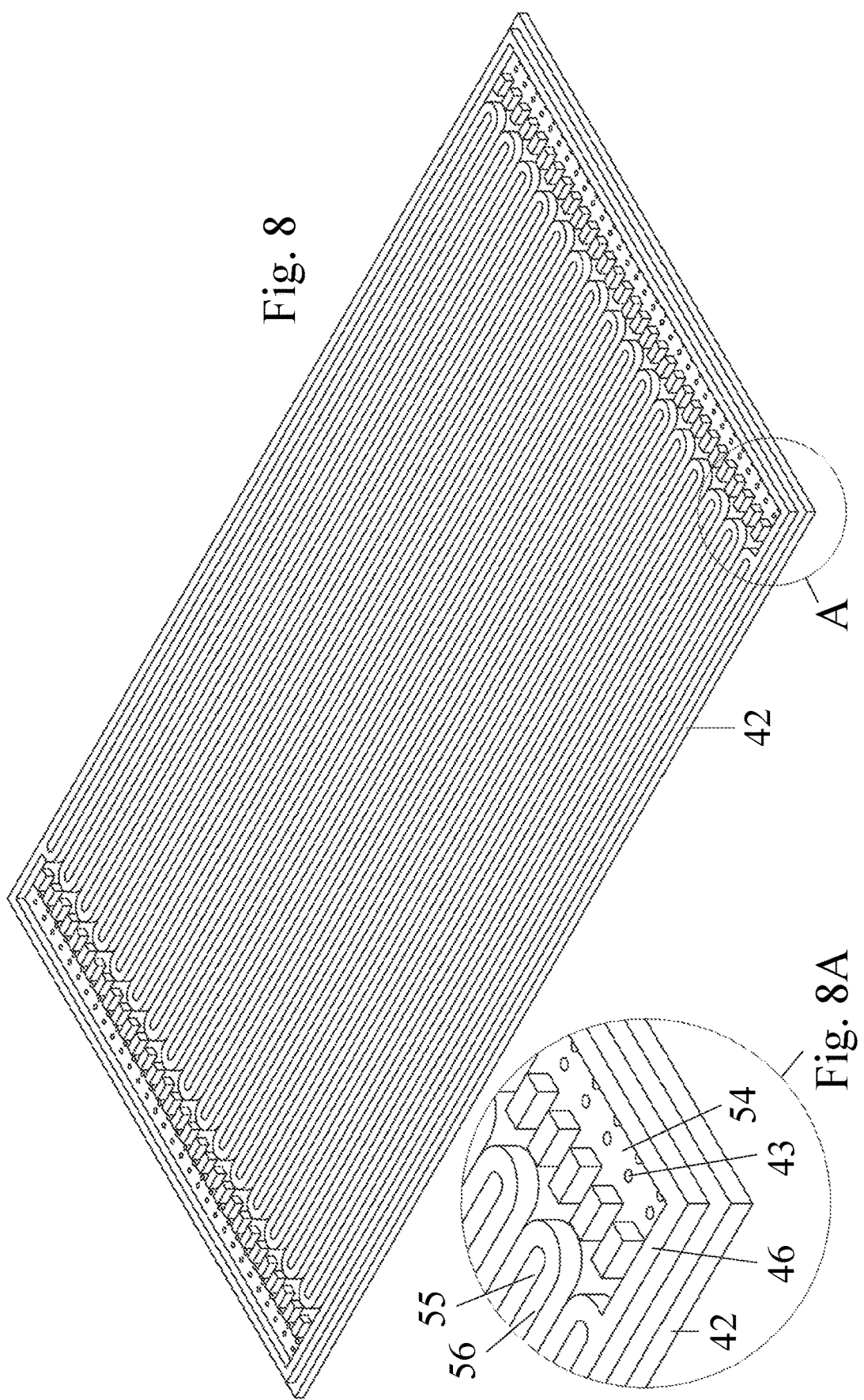

FIG. 8 shows an isometric view of the element sheet 42 coated with the photoresist that has been sensitized and developed removing the material to create a negative image of the intended nanolinear pattern.

Detail FIG. 8A shows the photoresist 46 applied on the top of the element sheet 42 with a series of removed areas 54 that create a series of cavities 55 that are surrounded by physical barriers 56 creating a negative image of the intended nanolinear pattern. The parallel linear barriers formed with curves and other shapes may be only nanometers apart to define the electrical connections of the electrodes. The removal of material of the photoresist 46 exposes the orifices 43 so that when the graphene ink (or other suitable ink) is applied to the orifices the ink is allowed to flow through to connect both sides of the element sheet 42.

Figure 9:
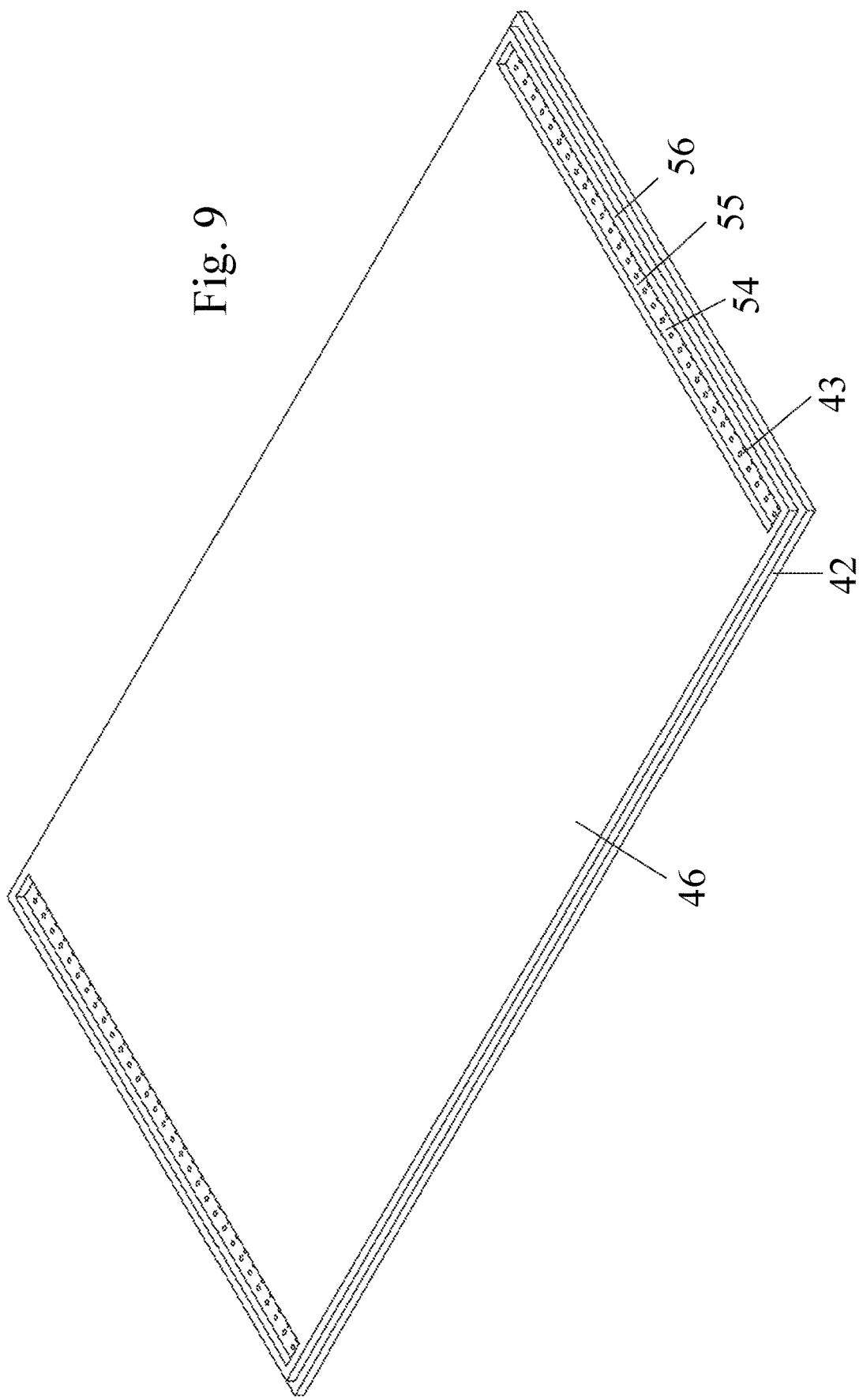

FIG. 9 shows the photoresist 46 applied on the bottom of the element sheet 42 with a series of removed areas 54 that create a negative image of the intended printing pattern. The removal of material of the photoresist 46 creates cavities 55 that expose the orifices 43 that are surrounded by physical barriers 56 so that when the graphene ink (or other suitable ink) is applied to the orifices the ink is allowed to flow through to connect both sides of the element sheet 42 providing an electrical connection along the extremities of each side of element sheet 42.

Figure 10:
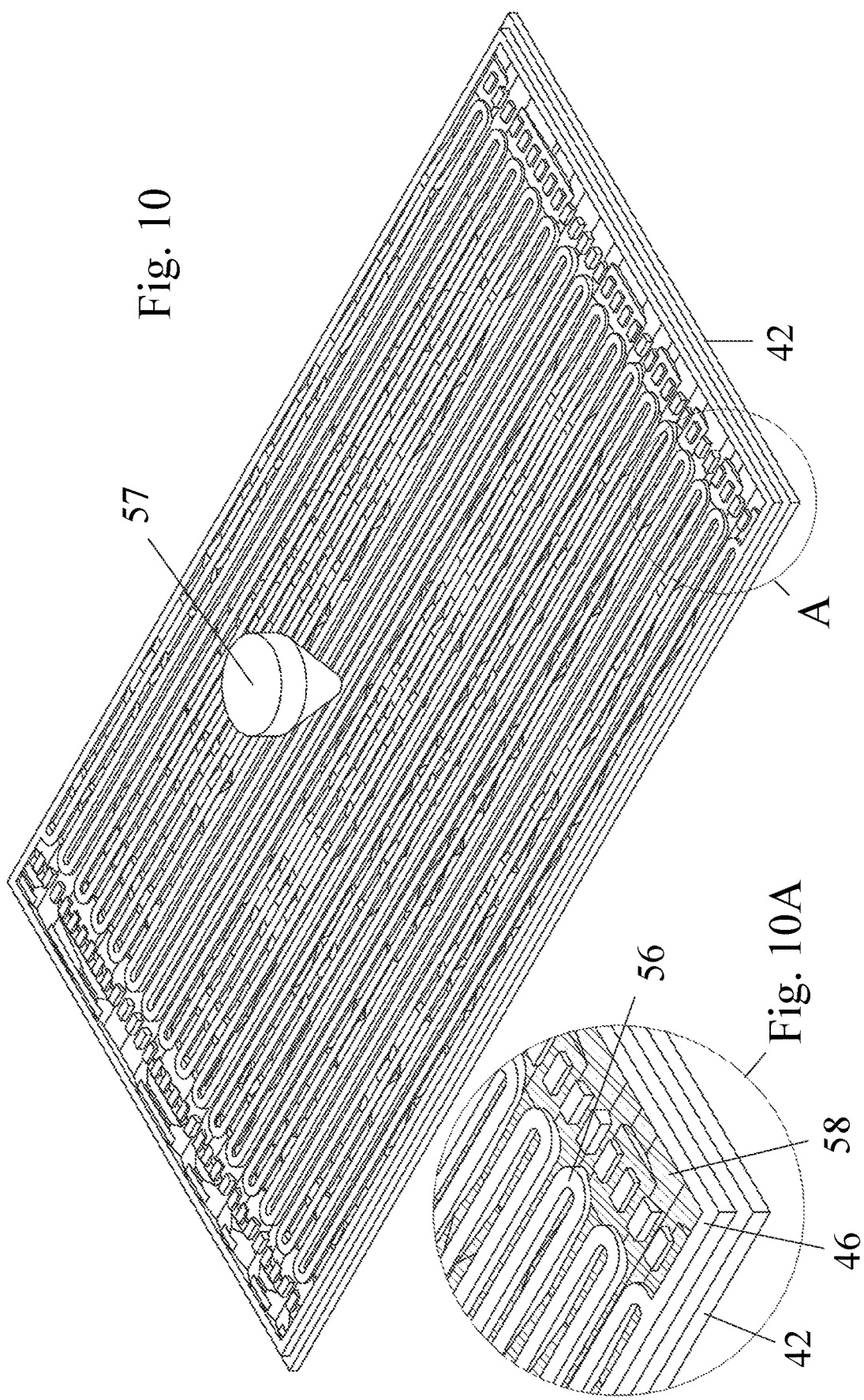

FIG. 10 shows an isometric view of the element sheet 42 as the removed areas of the photoresist are being filled with ink supplied by a printer head 57.

Detail FIG. 10A shows that as adequate ink 58 is deposited, the remaining photoresist 46 acts as physical barriers 56 that contain the ink 58 forcing it to exactly match the intended nanolinear pattern to be left into the element sheet 42.

Figure 11:
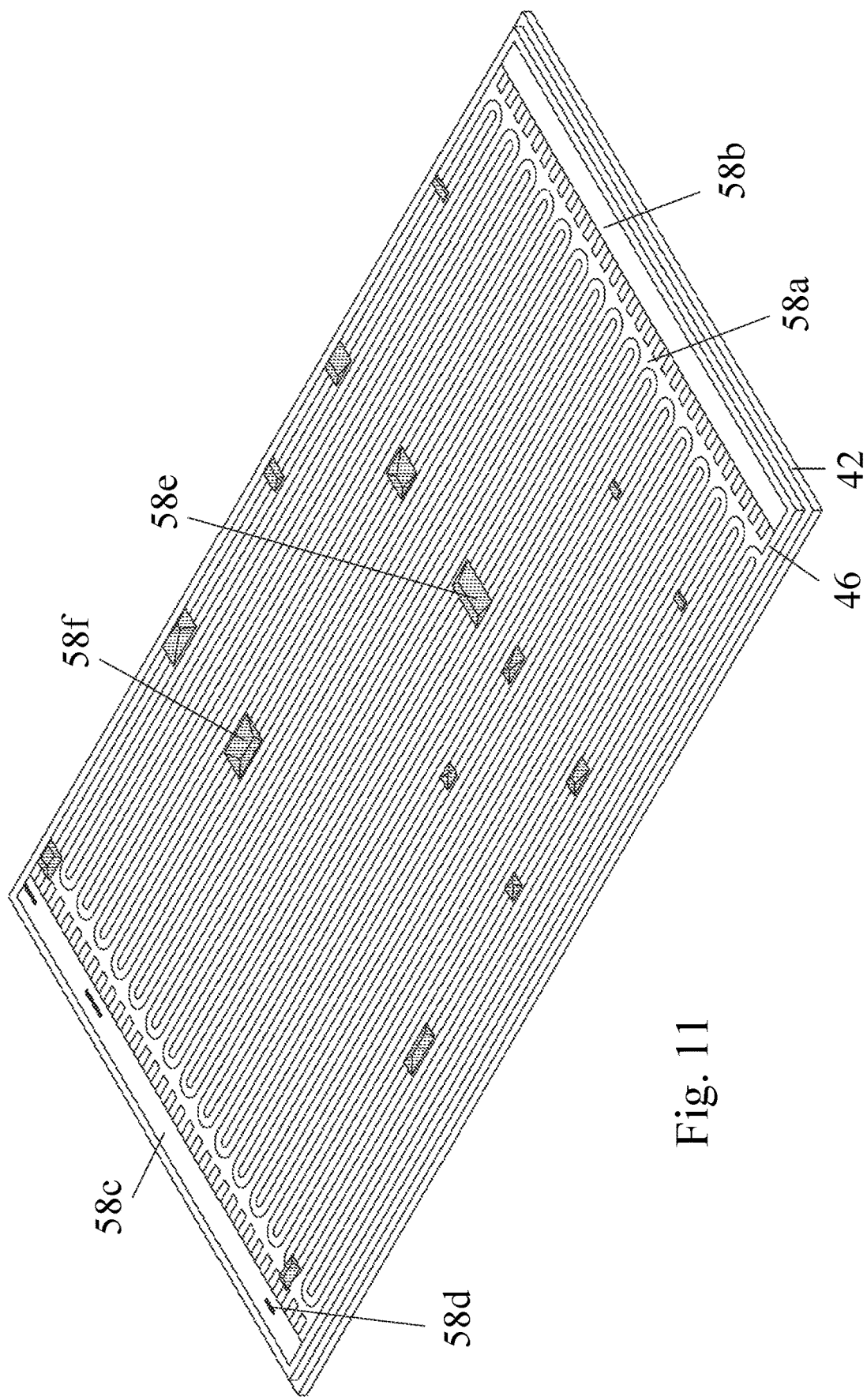

FIG. 11 shows an isometric view of the element sheet 42 as the deposition of ink has finished. The photoresist 46 has confined the ink into the photoresist free areas 58a, 58b, and 58c producing the intended nanolinear pattern. However, some ink may still overflow or spill over the top of the photoresist 46 barrier producing undesired deposits of ink 58d, 58e, 58f, etc. that need to be removed to avoid short circuits.

Figure 12:
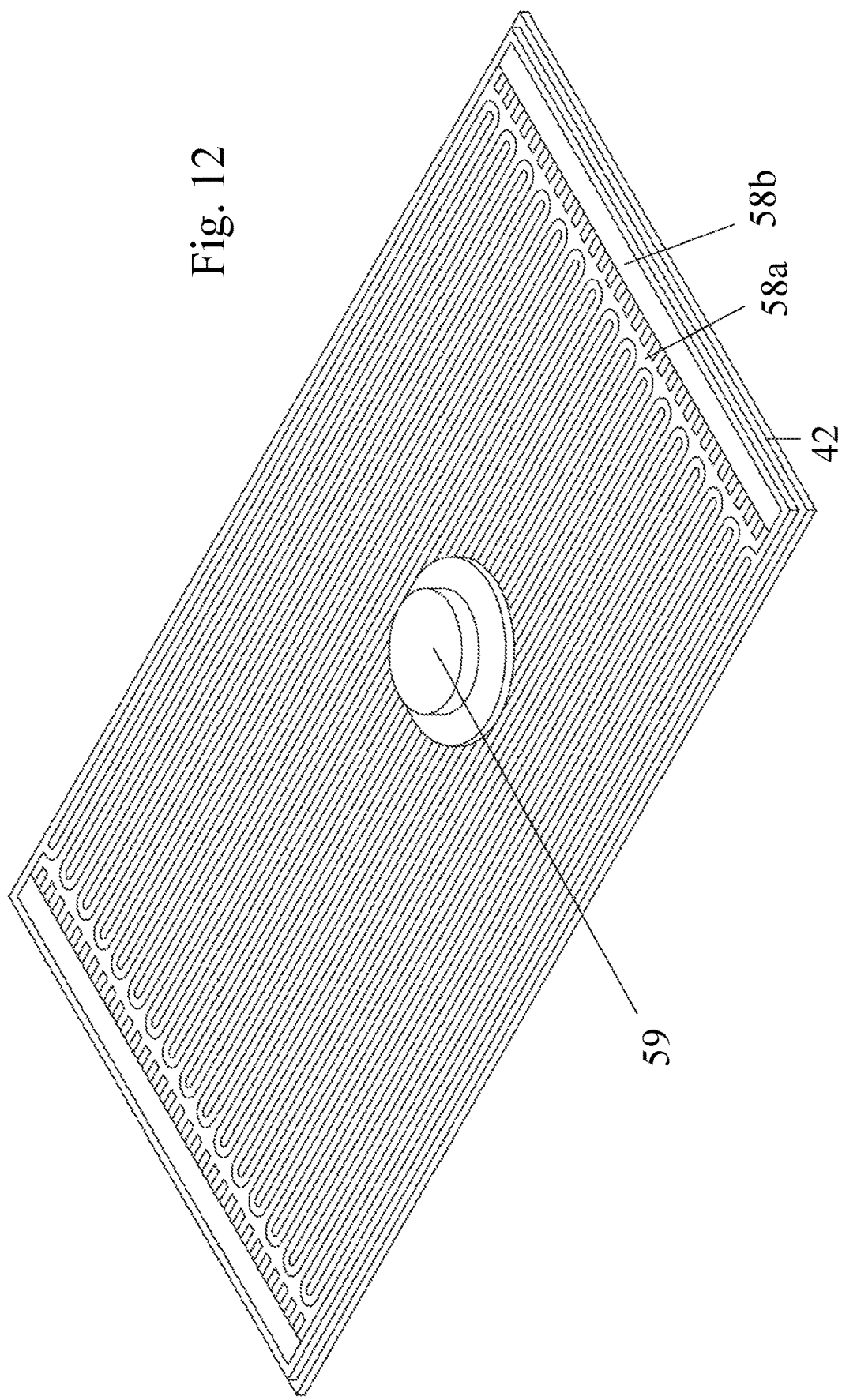

FIG. 12 shows an isometric view of the element sheet 42 as the deposition of ink has finished. The photoresist 46 has confined the ink into the photoresist free areas 58a, 58b producing the intended nanolinear pattern. An ink remover 59 such as through polishing is then used to eliminate the undesired deposits of ink producing a perfect sheet with no short circuits.

Figure 13:
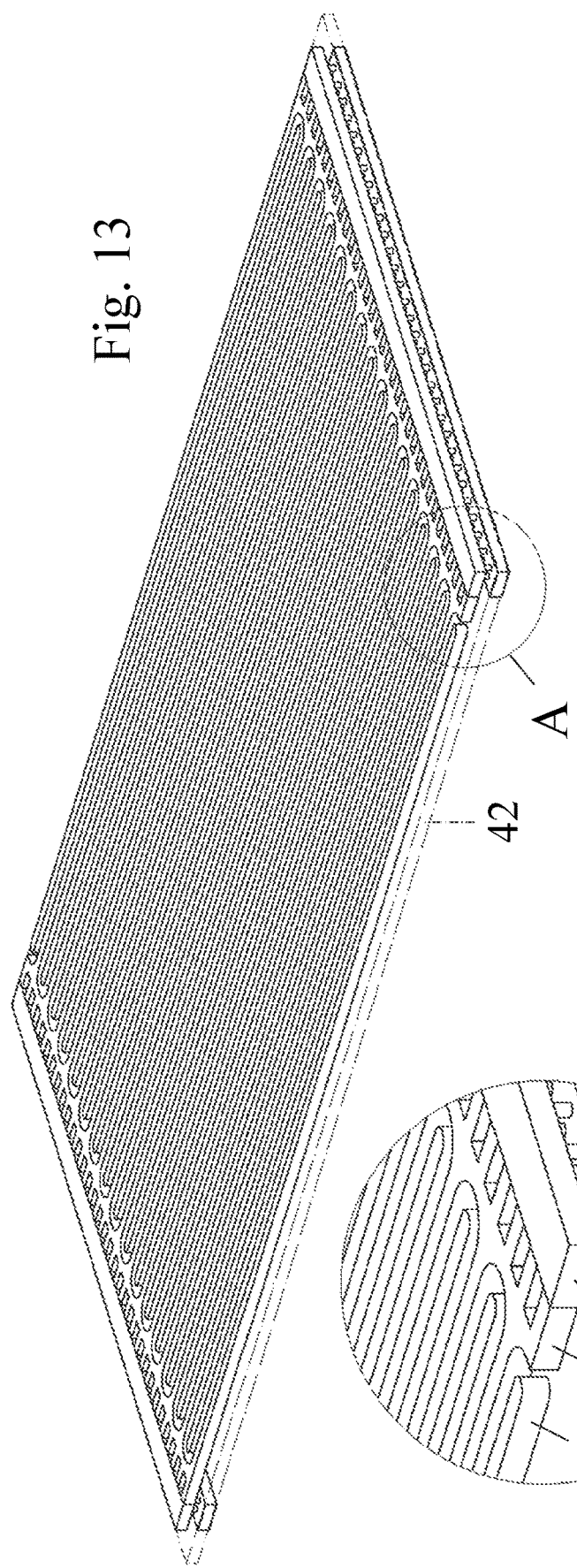

FIG. 13 shows an isometric view of the element sheet 42 drawn in phantom lines to show the resulting printed features.

Figure 13A:
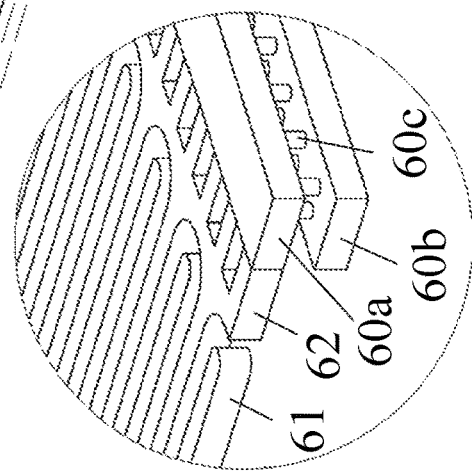

Detail FIG. 13A shows that the process produces a terminal that is made of two halves 60a and 60b connected by a series of bridges 60c made of ink that had passed through the orifices made into the element sheet. The electrode A 61 and the electrode B 62 can also be seen (see FIG. 15).

Figure 14:
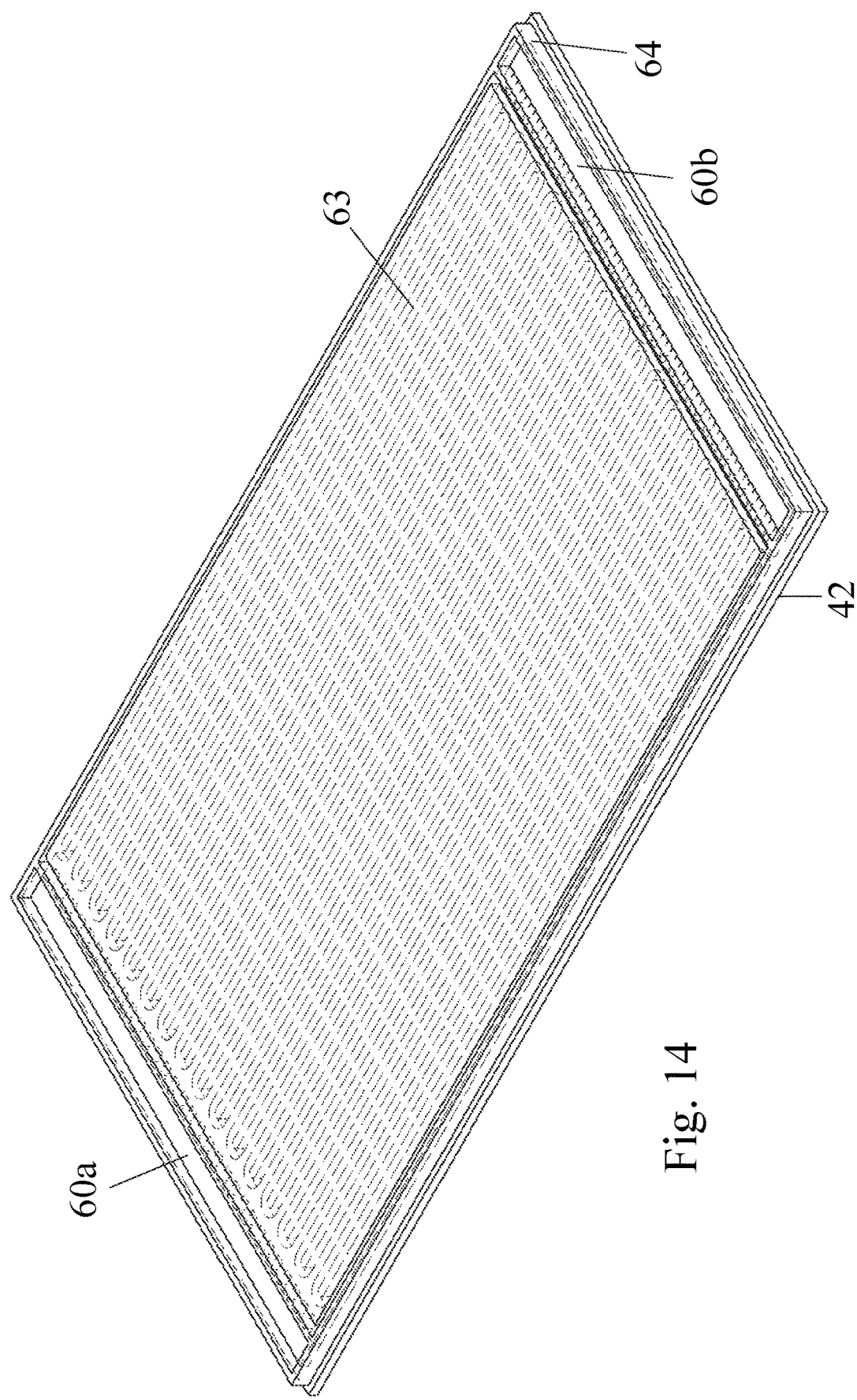

FIG. 14 shows an isometric view of the element sheet 42 as a glue strip 64 and an electrolyte 63 are applied. The electrolyte 63 is applied on top of the nanolinear pattern design covering everything except terminals 60a and 60b. The glue strip 64 encircles the electrolyte 63 and both terminals 60a and 60b providing a containment to the electrolyte 63 and helps to secure the terminals in place once the element sheets are stacked (see FIG. 26, FIG. 27, FIG. 28, and FIG. 29).

Figure 15:
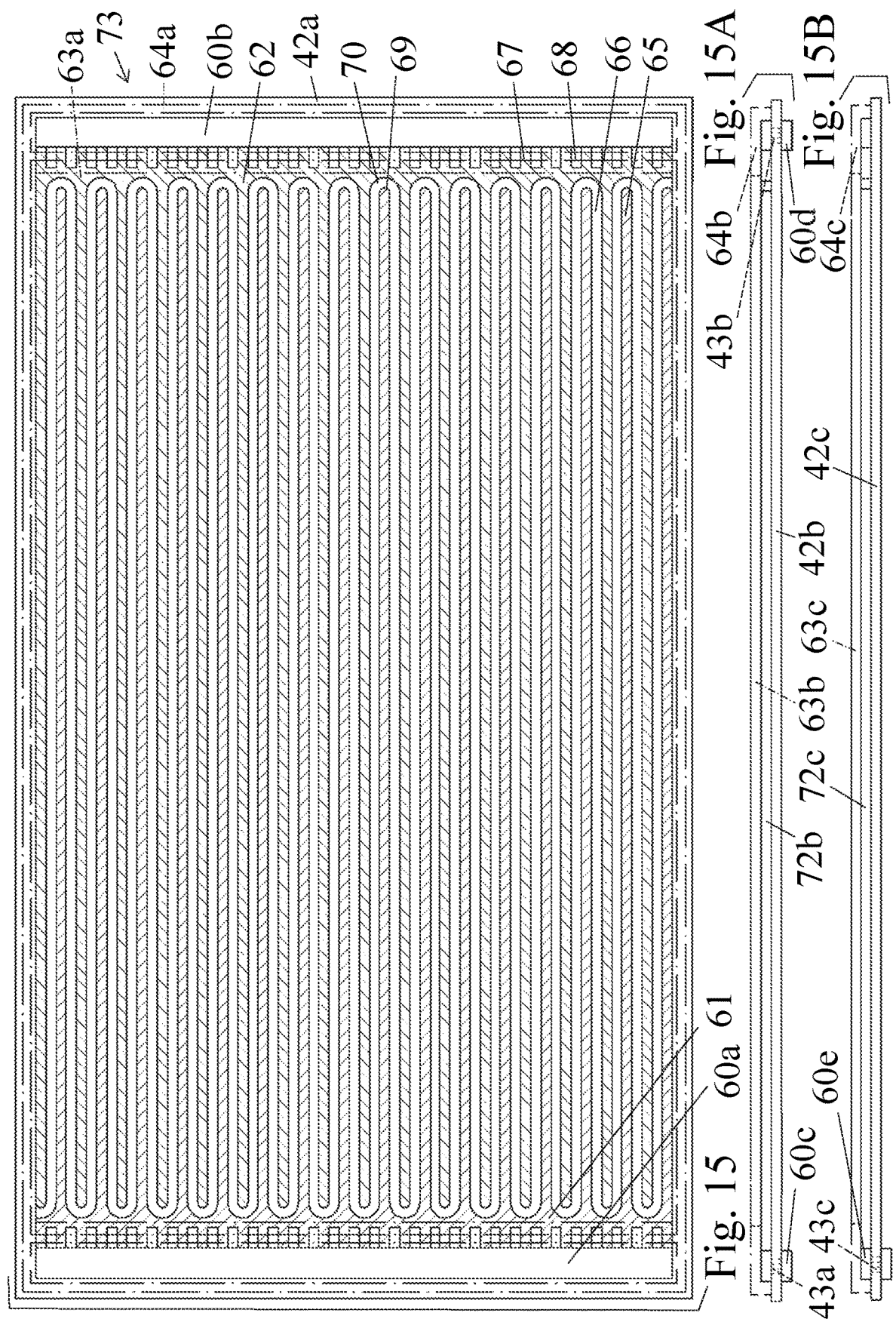

FIG. 15 shows a top view of the element sheet 42a printed with the nanolinear pattern in a parallel design 73. The parallel design 73 is used to maximize the number of individual capacitors that can be printed into a sheet using the most effective nanolinear pattern, that has linear barriers that extend in the direction of printing to minimize printing complexity and by doing so reduce costs and printing errors. The parallel design 73 is composed of a pair of terminals 60a and 60b that will become the positive and negative poles of the capacitor. The terminal 60a is connected to an electrode A 61 and the terminal 60b is connected to an electrode B 62 by a series of electrode connections 67 leaving a series of electrode connection gaps 68 that expose the material of the element sheet 42.

The electrode A 61 and the electrode B 62 have a series of intertwined fringes 65 that are separated by an electrode gap 66 that meanders between them. To facilitate the identification of the individual fringes the electrode A 61 is drawn with 45 degree left to right hatched lines and the electrode B 62 is drawn with 45 degree right to left hatched lines.

To avoid spiked edges that have a concentrating effect on the electrical field that would negatively impair the performance of the supercapacitor device, each of the individual fringes of the electrodes terminate in a curved end 69 that is matched by a curved contour 70 on the other electrode. A layer of a suitable electrolyte 63a is printed on the top of the parallel design 73 covering all fringes of both the electrode A 61 and the electrode B 62 but leaving the electrode connection gaps 68 uncovered. In that way when a group of element sheets are stacked to produce a supercapacitor device, the electrolyte 63a can be sealed inside the stack by melting a thin strip of material of the element sheets or applying a glue strip 64a along the line passing at the middle of the electrode connection gaps 68 on both extremities of the element sheets and around the outermost fringes of the electrode A 61 and the electrode B 62 (see FIG. 33).

FIG. 15A shows a front view of the element sheet 42b that has the printed layer 72b with two terminals 60c and 60d that both extend to the other side of the printed layer 72b in case of an element sheet tailored to be used in parallel. The orifices 43a, 43b drawn in dashed lines connect the terminals in one side of the element sheet to the corresponding terminals on the other side. The electrolyte 63b is applied on top of the printed layer 72b. The glue strip 64b encircles the element sheet 42b.

FIG. 15B shows a front view of the element sheet 42c that has the printed layer 72c with only one terminal 60e that extends to the other side of the printed layer 72c in case of an element sheet tailored to be used in series. The orifices 43c drawn in dashed lines connect the terminal in one side of the element sheet to the corresponding terminal on the other side. The electrolyte 63c is applied on top of the printed layer 72c. The glue strip 64c encircles the element sheet 42c.

Each set of one fringe of the electrode A and one fringe of the electrode B implement one individual capacitor. The fringes are made as thin as possible and as high as possible to maximize the surface area that each individual element sheet can contain. The height of the fringes can be controlled by varying the thickness of the applied photoresist.

Figure 16:
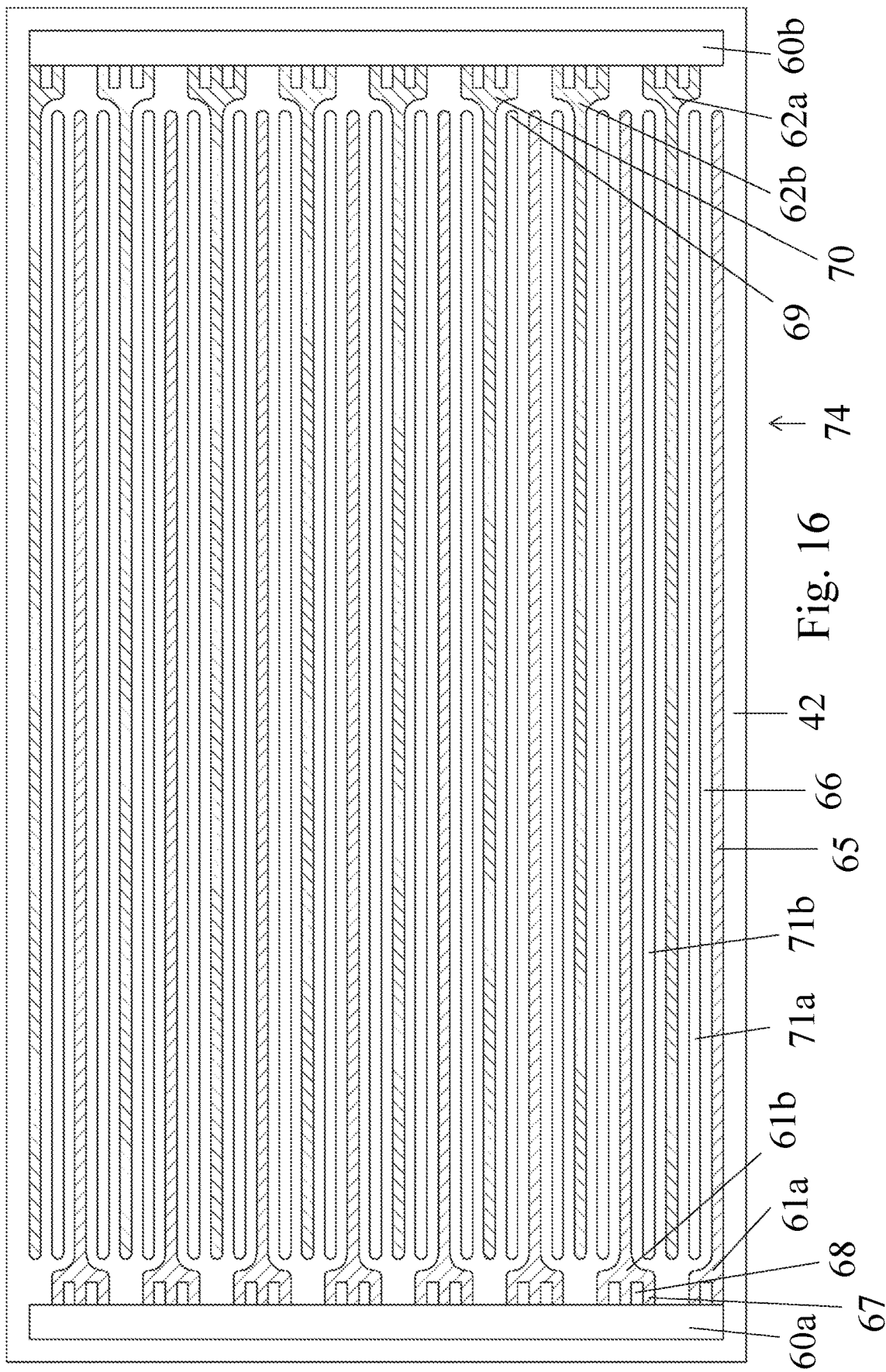

FIG. 16 shows a top view of the element sheet 42 printed with a nanolinear pattern series 2 design 74. The series 2 design 74 is composed of a pair of terminals 60a and 60b that will become the positive and negative poles of the capacitor. The terminal 60a is connected to several electrode A 61a, 61b, etc. and the terminal 60b is connected to several electrode B 62a, 62b, etc. by a series of electrode connections 67 leaving a series of electrode connection gaps 68 that expose the material of the element sheet 42. Between the fringes 65 of each pair of electrodes, a series electrode 71a, 71b, etc. is introduced creating two capacitors in series arranged in several parallel blocks. All electrode fringes are separated by electrode gaps 66. To facilitate the identification of the individual fringes the electrode A 61 is drawn with 45 degree left to right hatched lines and the electrode B 62 is drawn with 45 degree right to left hatched lines while the series electrode 71 is left unmarked.

To avoid spiked edges that have a concentrating effect on the electrical field that would negatively impair the performance of the supercapacitor device, the individual fringes 65 of the electrodes terminate in curved ends 69 matched by curved contours 70 on the other electrode whenever applicable.

Each set of one fringe of the electrode A, one fringe of the electrode B and the fringe of the series electrode between them implement two individual capacitors connected in series. The fringes are made as thin as possible and as high as possible to maximize the surface area that each individual element sheet can contain. The height of the fringes can be controlled by varying the thickness of the applied photoresist.

Figure 17:
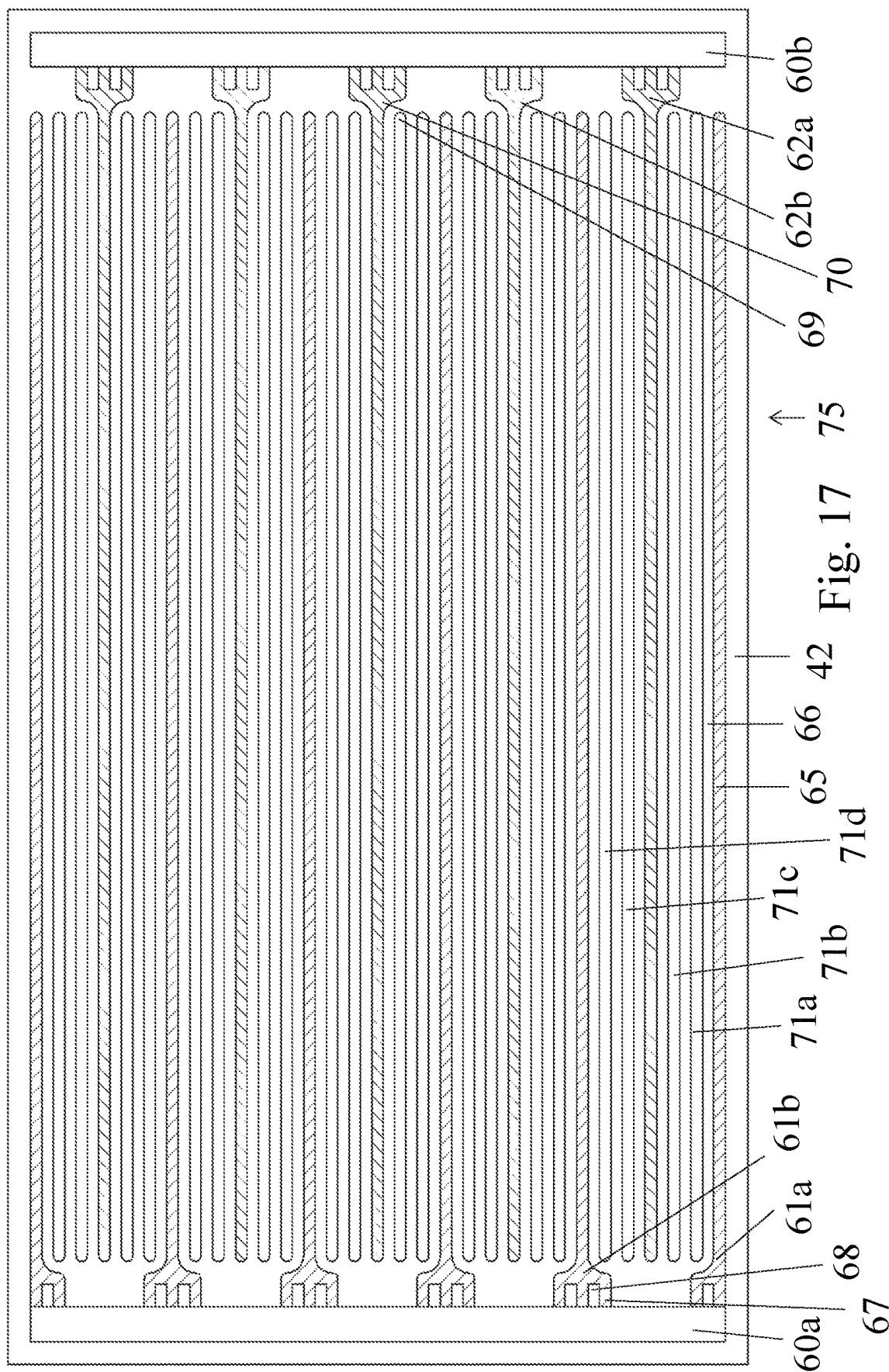

FIG. 17 shows a top view of the element sheet 42 printed with a nanolinear pattern series 3 design 75. The series 3 design 75 is composed of the terminals 60a and 60b that will become the positive and negative poles of the capacitor. The terminal 60a is connected to several electrode A 61a, 61b, etc. and the terminal 60b is connected to several electrode B 62a, 62b, etc. by electrode connections 67 leaving electrode connection gaps 68 that expose the material of the element sheet 42. Between the fringes 65 of each pair of electrodes, two series electrodes 71a, 71b, 71c, 71d, etc. are introduced creating three capacitors in series arranged in several parallel blocks. All electrode fringes are separated by electrode gaps 66. To facilitate the identification of the individual fringes the electrode A 61 is drawn with 45 degree left to right hatched lines and the electrode B 62 is drawn with 45 degree right to left hatched lines while the series electrode 71 is left unmarked.

To avoid spiked edges that have a concentrating effect on the electrical field that would negatively impair the performance of the supercapacitor device, the individual fringes of the electrodes terminate in curved ends 69 matched by curved contours 70 on the other electrode whenever applicable.

Each set of one fringe of the electrode A, one fringe of the electrode B and the two fringes of the series electrode between them implement three individual capacitors connected in series. The fringes are made as thin as possible and as high as possible to maximize the surface area that each individual element sheet can contain. The height of the fringes can be controlled by varying the thickness of the applied photoresist.

Figure 18:
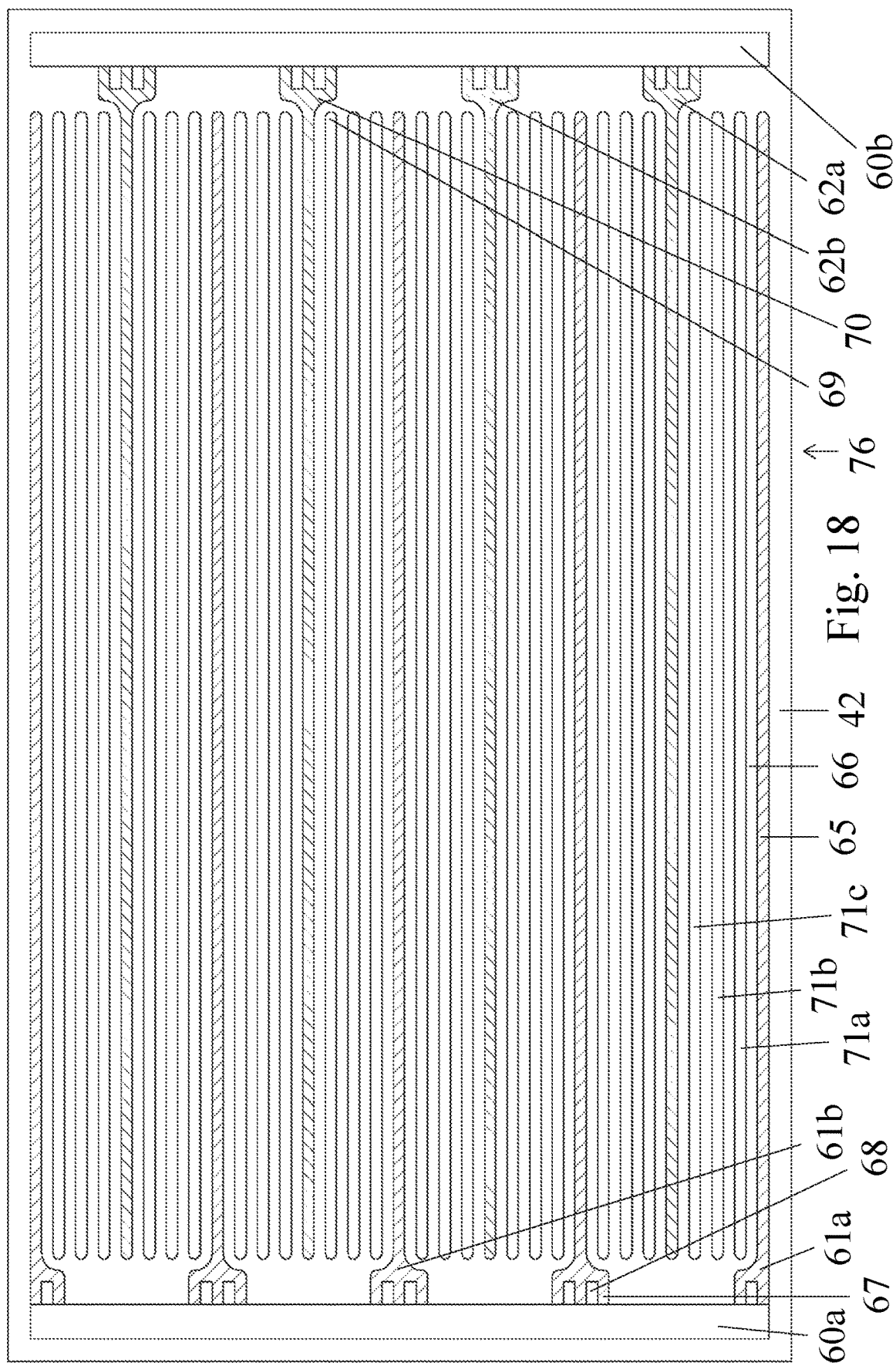

FIG. 18 shows a top view of the element sheet 42 printed with a nanolinear pattern series 4 design 76. The series 4 design 76 is composed of the terminals 60a and 60b that will become the positive and negative poles of the capacitor. The terminal 60a is connected to several electrode A 61a, 61b, etc. and the terminal 60b is connected to several electrode B 62a, 62b, etc. by electrode connections 67 leaving electrode connection gaps 68 that expose the material of the element sheet 42. Between the fringes 65 of each pair of electrodes, three series electrodes 71a, 71b, 71c, etc. are introduced creating four capacitors in series. All electrode fringes are separated by electrode gaps 66. To facilitate the identification of the individual fringes the electrode A 61 is drawn with 45 degree left to right hatched lines and the electrode B 62 is drawn with 45 degree right to left hatched lines while the series electrode 71 is left unmarked.

To avoid spiked edges that have a concentrating effect on the electrical field that would negatively impair the performance of the supercapacitor device, the individual fringes of the electrodes terminate in curved ends 69 matched by curved contours 70 on the other electrode whenever applicable.

Each set of one fringe of the electrode A, one fringe of the electrode B and the three fringes of the series electrode between them implement four individual capacitors connected in series. The fringes are made as thin as possible and as high as possible to maximize the surface area that each individual element sheet can contain. The height of the fringes can be controlled by varying the thickness of the applied photoresist.

Figure 19:
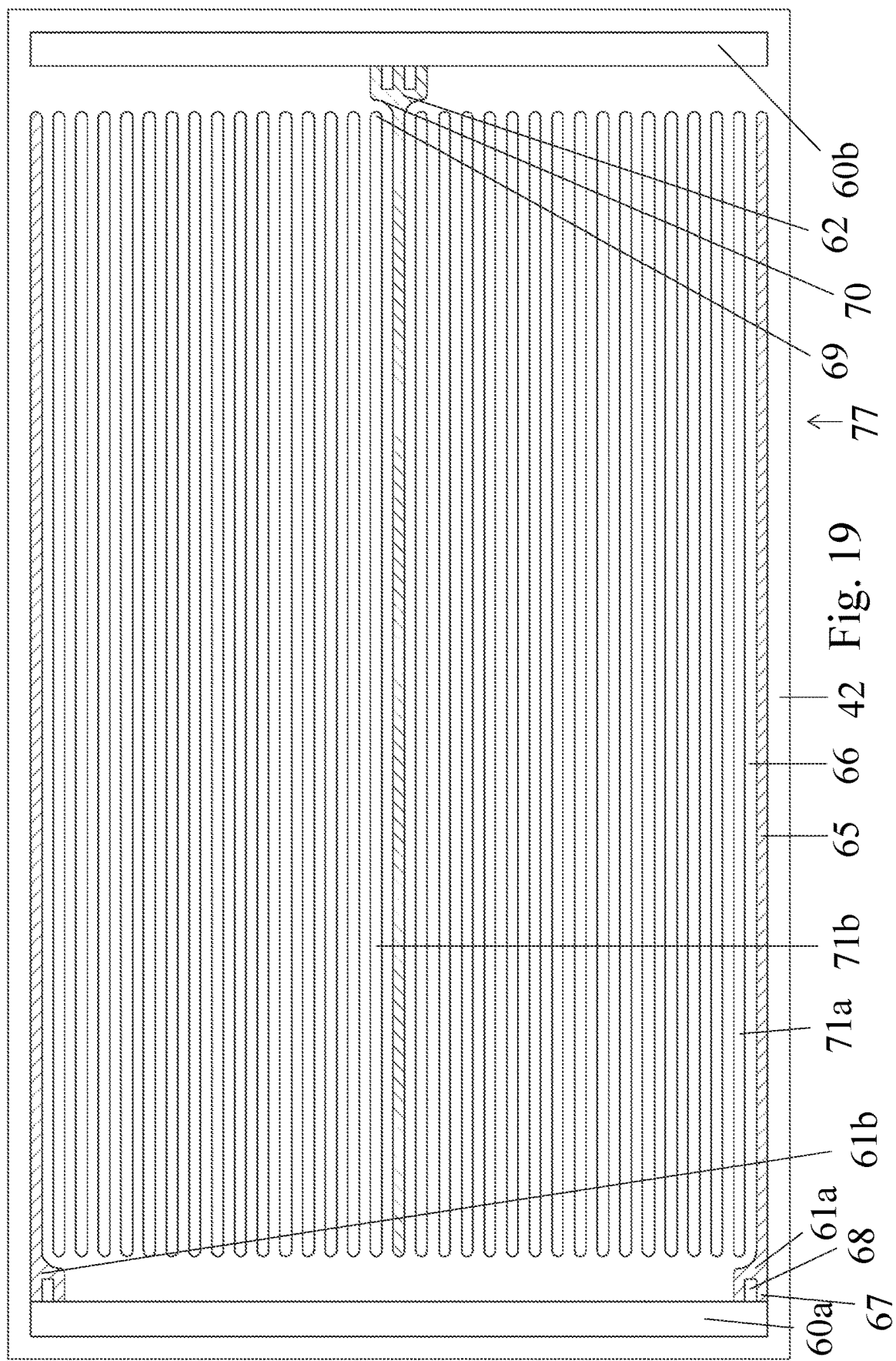

FIG. 19 shows a top view of the element sheet 42 printed with a nanolinear pattern series half full design 77. The series half full design 77 is composed of the terminals 60a and 60b that will become the positive and negative poles of the capacitor. The terminal 60a is connected to two electrode A 61a and 61b, and the terminal 60b is connected to one electrode B 62 by electrode connections 67 leaving electrode connection gaps 68 that expose the material of the element sheet 42. Between the fringes 65 of each pair of electrodes, several series electrodes 71a, 71b, etc. are introduced creating several capacitors in series arranged in two parallel blocks. All electrode fringes are separated by electrode gaps 66. To facilitate the identification of the individual fringes the electrode A 61 is drawn with 45 degree left to right hatched lines and the electrode B 62 is drawn with 45 degree right to left hatched lines while the series electrodes 71 are left unmarked.

To avoid spiked edges that have a concentrating effect on the electrical field that would negatively impair the performance of the supercapacitor device, the individual fringes of the electrodes terminate in curved ends 69 matched by curved contours 70 on the other electrode whenever applicable.

Figure 20:
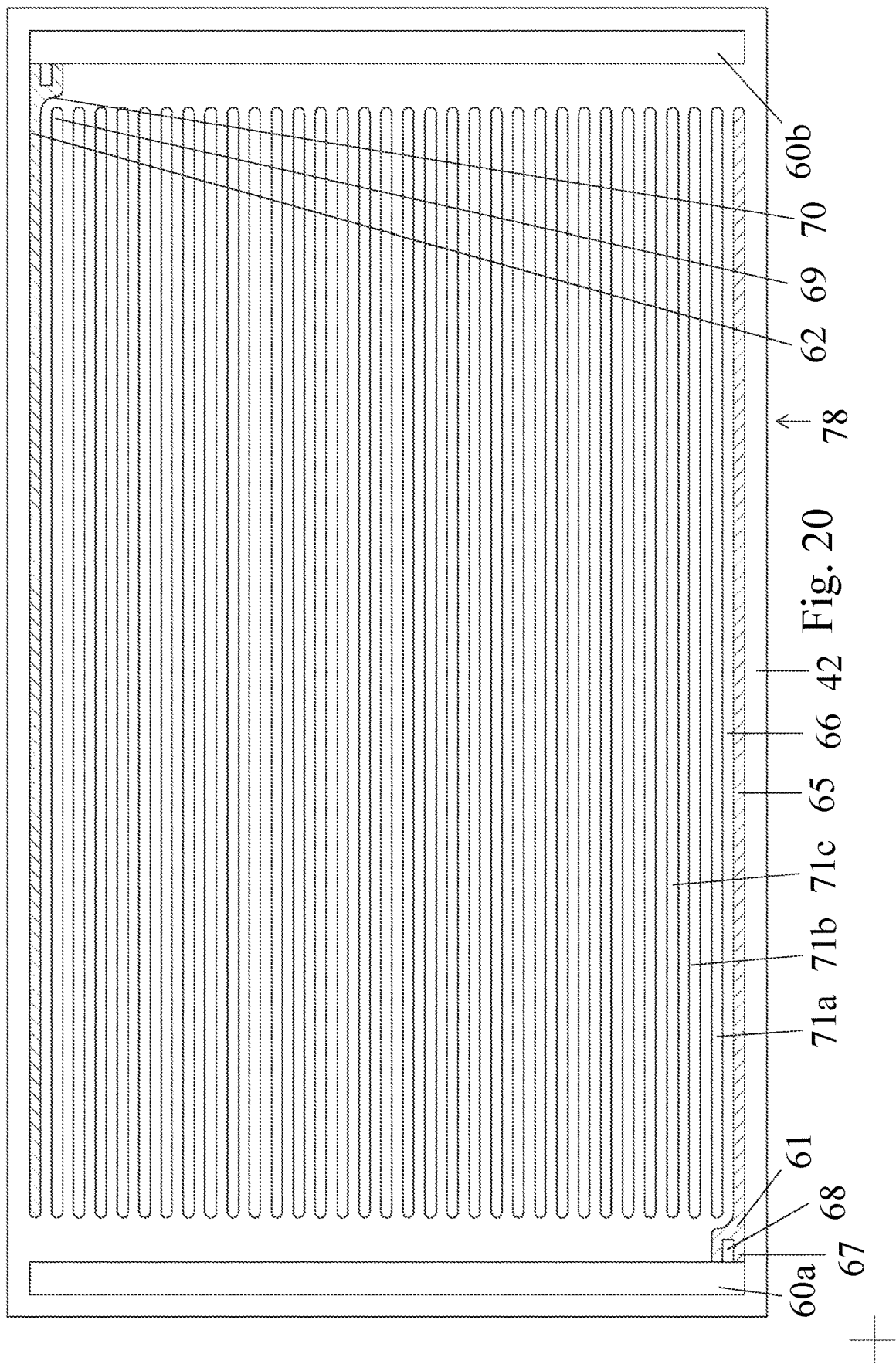

FIG. 20 shows a top view of the element sheet 42 printed with a nanolinear pattern series full design 78. The series full design 78 is composed of the terminals 60a and 60b that will become the positive and negative poles of the capacitor. The terminal 60a is connected to one electrode A 61 and the terminal 60b is connected to one electrode B 62 by electrode connections 67 leaving electrode connection gaps 68 that expose the material of the element sheet 42. Between the fringes 65 of the electrodes, several series electrodes 71a, 71b, 71c, etc. are introduced creating several capacitors in series arranged in one block. All electrode fringes are separated by electrode gaps 66. To facilitate the identification of the individual fringes the electrode A 61 is drawn with 45 degree left to right hatched lines and the electrode B 62 is drawn with 45 degree right to left hatched lines while the series electrodes 71 are left unmarked.

To avoid spiked edges that have a concentrating effect on the electrical field that would negatively impair the performance of the supercapacitor device, the individual fringes of the electrodes terminate in curved ends 69 matched by curved contours 70 on the other electrode whenever applicable.

Other configurations that produce other arrangements of m paralleled sets of n capacitors in series can be easily produced by altering the pattern of electrode A, electrode B and series electrodes that may be printed or otherwise applied to the element sheet 42.

Figure 21:
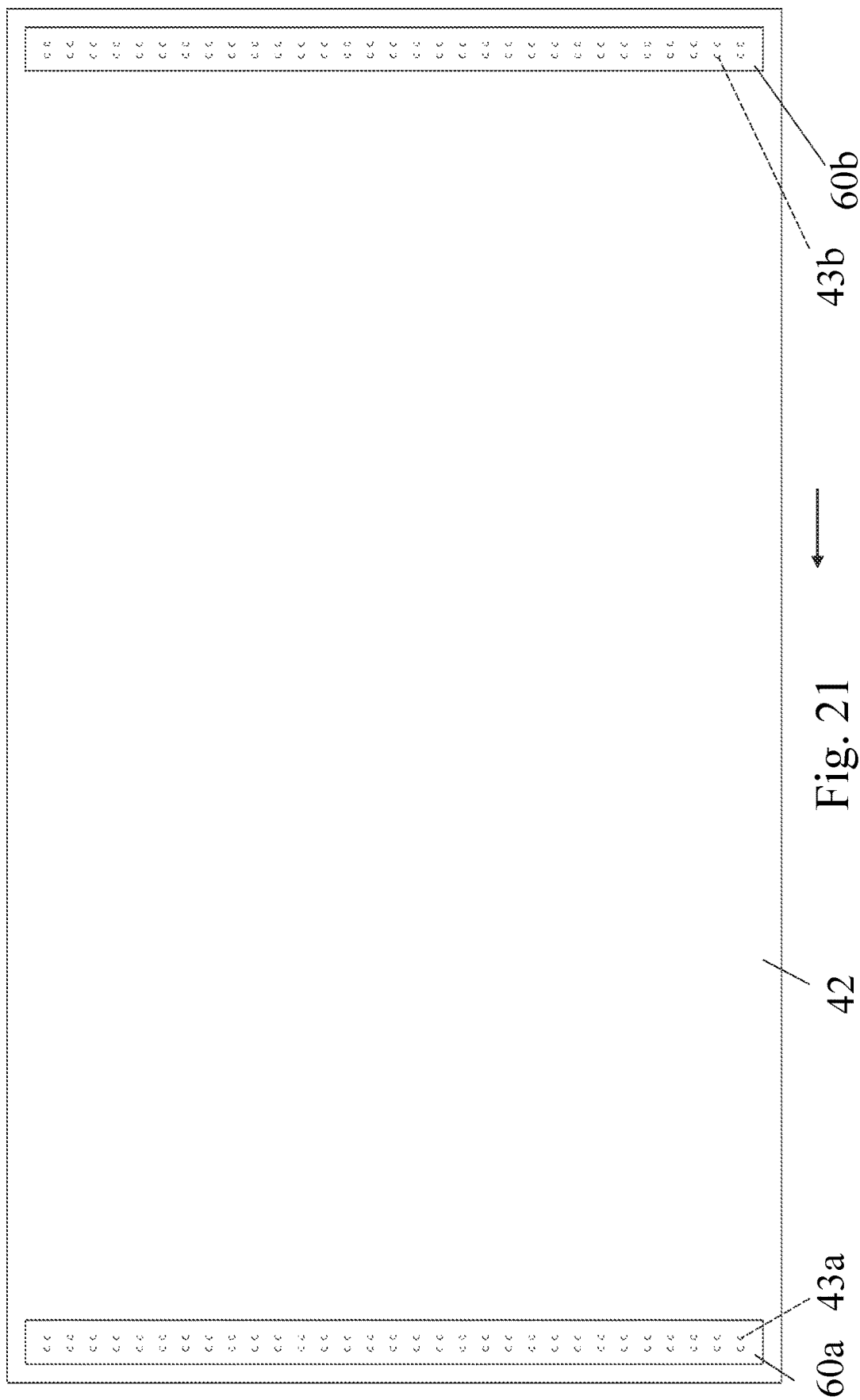

In another embodiment of the invention, FIG. 21 shows a top view of an element sheet 42 on which two terminals 60a and 60b are printed directly on top of orifices 43a, 43b using traditional printing techniques that do not require photoresist. The terminals 60a and 60b are printed as a thick line perpendicular to the direction of the printing (indicated by the straight arrow) and are made with a size slightly bigger than necessary to accommodate small subsequent printing errors.

Figure 22:
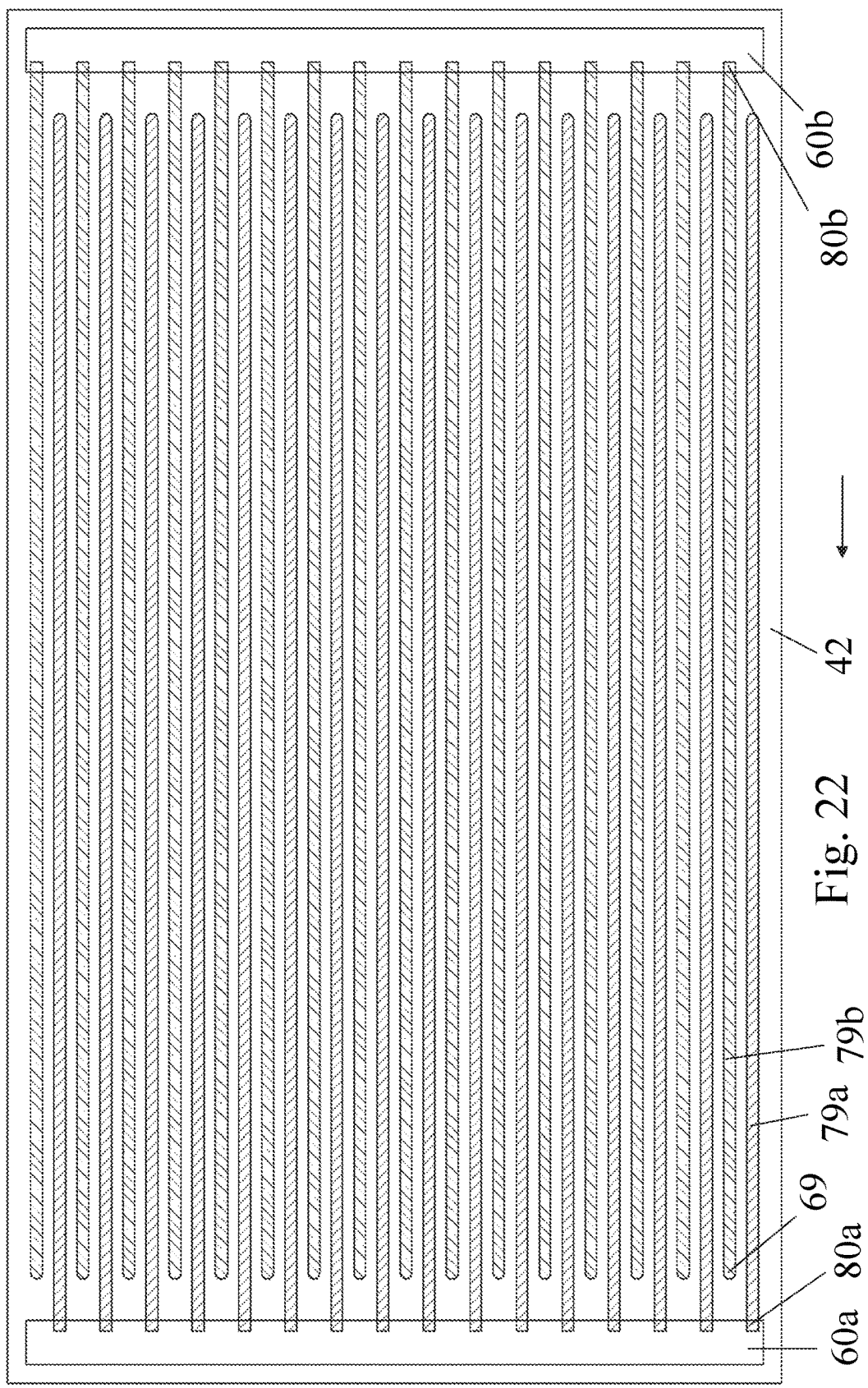

FIG. 22 shows a top view of an element sheet 42 with two terminals 60a and 60b printed as explained in FIG. 21. A pattern consisting of a series of thin lines 79a, 79b, etc printed in the direction of printing (indicated by the straight arrow) is then added to the element sheet 42 in such a way that alternating thin lines start at one terminal and do not reach the other. The thin lines 79a, 79b, etc. may terminate in curved ends 69 or not depending on the level of control that the printer equipment can offer. To ensure proper operation each thin line 79a, 79b, etc. have a thin line extra run 80a, 80b, etc. that advances over the recently printed terminal to which the line is supposed to be connected and terminates at a safe distance from the other. As the terminals are made larger than necessary, the thin line pattern is printed in the direction of the printing and the thin lines are printed overrunning the terminals, small errors in the positioning of the thin line pattern can be accommodated. As a result this design enables existing printing equipment to be tuned to produce thin lines as thin as 1 micron, separated by gaps of 1 micron when their normal maximum resolution would be 5 microns or more.

The thin lines implement the electrodes of individual capacitors and are made as thin as possible and as high as possible to maximize the surface area that each individual element sheet can contain. The height of the thin lines can be controlled by varying the viscosity of the ink: using a more viscous ink produces a higher line. Depending on the process, quick drying ink or ink that cures with UV light or using another method may be applied to further increase the attainable height of the thin lines.

The pattern illustrated in FIG. 22 produces an element sheet with all individual capacitors arranged in parallel. This configuration is similar to the one described in FIG. 15.

Figure 23:
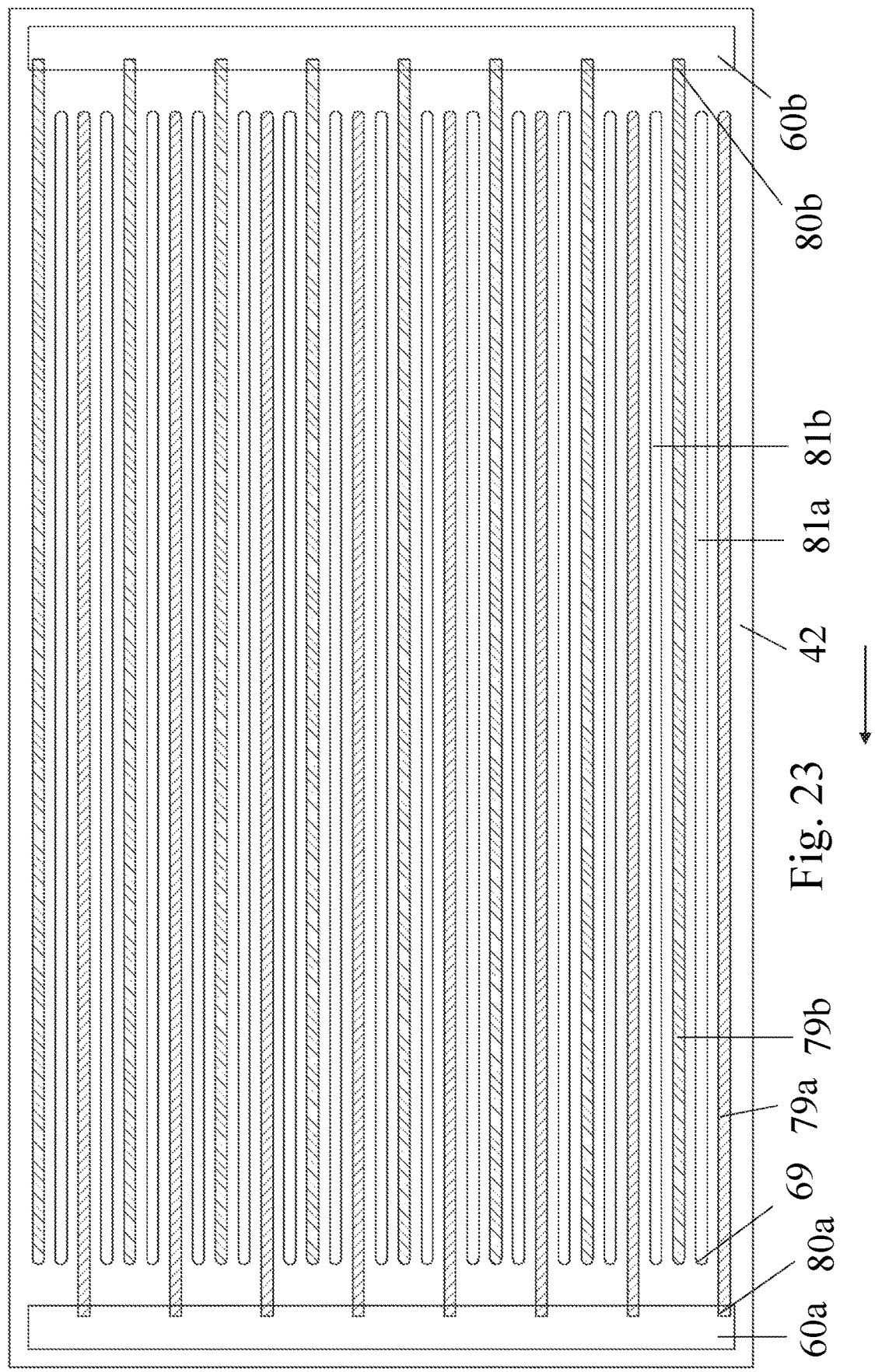

FIG. 23 shows a top view of an element sheet 42 with two terminals 60a and 60b printed as explained in FIG. 21. A pattern consisting of a series of thin lines 79a, 79b, etc and short thin lines 81a, 81b, etc. printed in the direction of printing (indicated by the straight arrow) is then added to the element sheet 42 in such a way that alternating thin lines 79a, 79b, etc start at one terminal and do not reach the other and the short thin lines 81a, 81b, etc. do not touch either one of the terminals. The thin lines 79a, 79b, etc. and the short thin lines 81a, 81b, etc. may terminate in curved ends 69 or not depending on the level of control that the printer equipment can offer. To ensure proper operation the thin lines 79a, 79b, etc. have thin line extra runs 80a, 80b, etc. that advance over the recently printed terminal to which the line is supposed to be connected and terminates at a safe distance from the other. As the terminals are made larger than necessary, the thin line and short thin line pattern is printed in the direction of the printing and the thin lines are printed overrunning the terminals, small errors in the positioning of the thin line and short thin line pattern can be accommodated. As a result this design enables existing printing equipment to be tuned to produce thin lines and short thin lines as thin as 1 micron, separated by gaps of 1 micron when their normal maximum resolution would be 5 microns or more.

The pattern illustrated in FIG. 23 with one short thin line printed between every two thin lines produces an element sheet with m paralleled sets of 2 capacitors in series, where m depends on the width of the element sheet and the thickness of the thin lines and short thin lines printed. This configuration is similar to the one described in FIG. 16.

The thin lines and the short thin lines implement the electrodes of individual capacitors and are made as thin as possible and as high as possible to maximize the surface area that each individual element sheet can contain. The height of the thin lines and the short thin lines can be controlled by varying the viscosity of the ink: using a more viscous ink produces a higher line. Depending on the process, quick drying ink or ink that cures with UV light or using another method may be applied to further increase the attainable height of the thin lines and the short thin lines.

Figure 24:
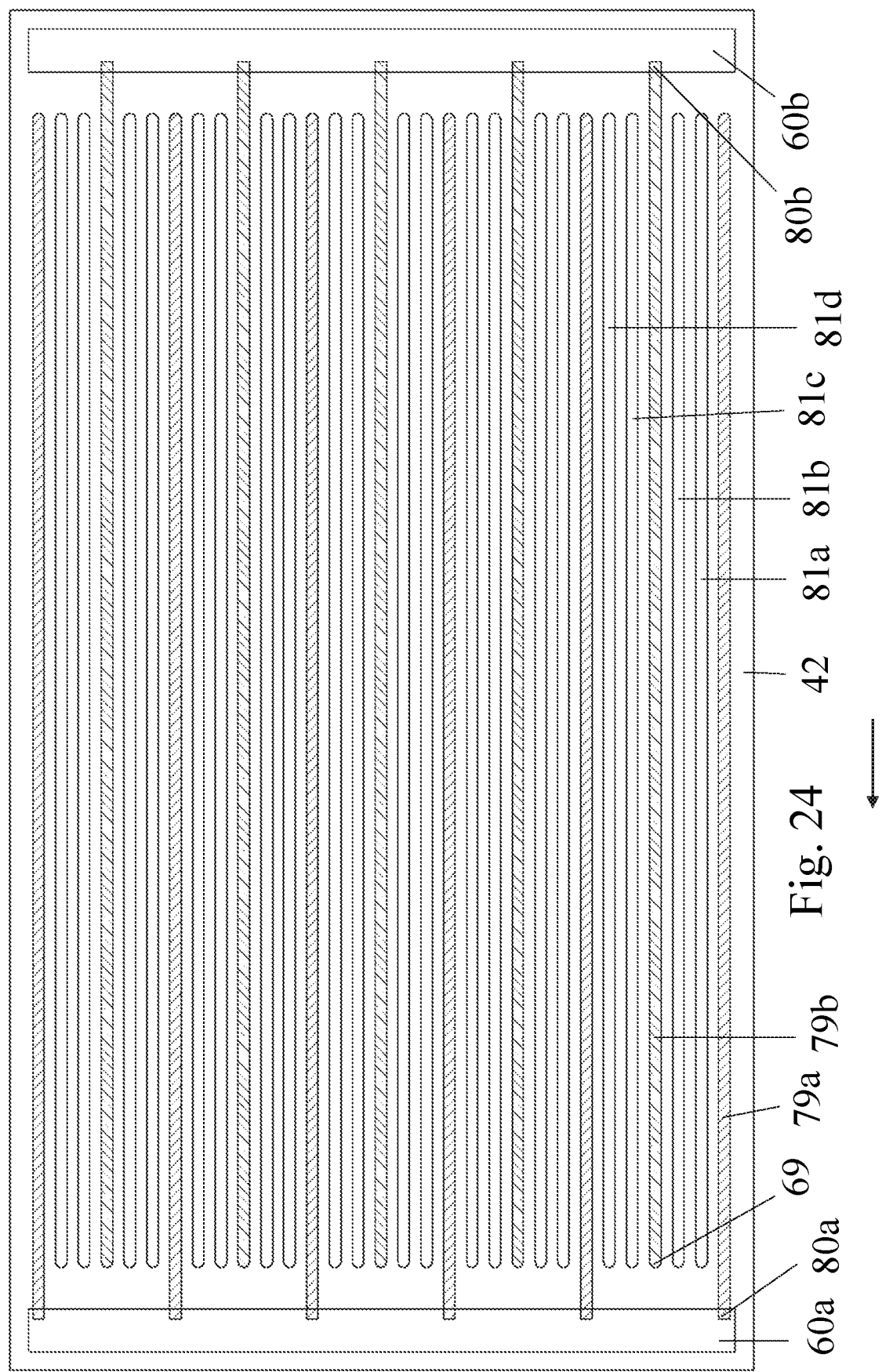

FIG. 24 shows a top view of an element sheet 42 with two terminals 60a and 60b printed as explained in FIG. 21. A pattern consisting of a series of thin lines 79a, 79b, etc and short thin lines 81a, 81b, etc. printed in the direction of printing (indicated by the straight arrow) is then added to the element sheet 42 in such a way that alternating thin lines 79a, 79b, etc start at one terminal and do not reach the other and the short thin lines 81a, 81b, etc. do not touch either one of the terminals. The thin lines 79a, 79b, etc. and the short thin lines 81a, 81b, etc. may terminate in curved ends 69 or not depending on the level of control that the printer equipment can offer. To ensure proper operation the thin lines 79a, 79b, etc. have thin line extra runs 80a, 80b, etc. that advance over the recently printed terminal to which the line is supposed to be connected and terminates at a safe distance from the other. As the terminals are made larger than necessary, the thin line and short thin line pattern is printed in the direction of the printing and the thin lines are printed overrunning the terminals, small errors in the positioning of the thin line and short thin line pattern can be accommodated. As a result this design enables existing printing equipment to be tuned to produce thin lines and short thin lines as thin as 1 micron, separated by gaps of 1 micron when their normal maximum resolution would be 5 microns or more.

The pattern illustrated in FIG. 24 with two short thin lines printed between every two thin lines produces an element sheet with m paralleled sets of 3 capacitors in series, where m depends on the width of the element sheet and the thickness of the thin lines and short thin lines printed. This configuration is similar to the one described in FIG. 17.

Other configurations, similar to the ones described in FIG. 18, FIG. 19, and FIG. 20 as well as other arrangements of m paralleled sets of n capacitors in series can be easily produced by altering the pattern of thin lines and short thin lines printed.

Figure 25:
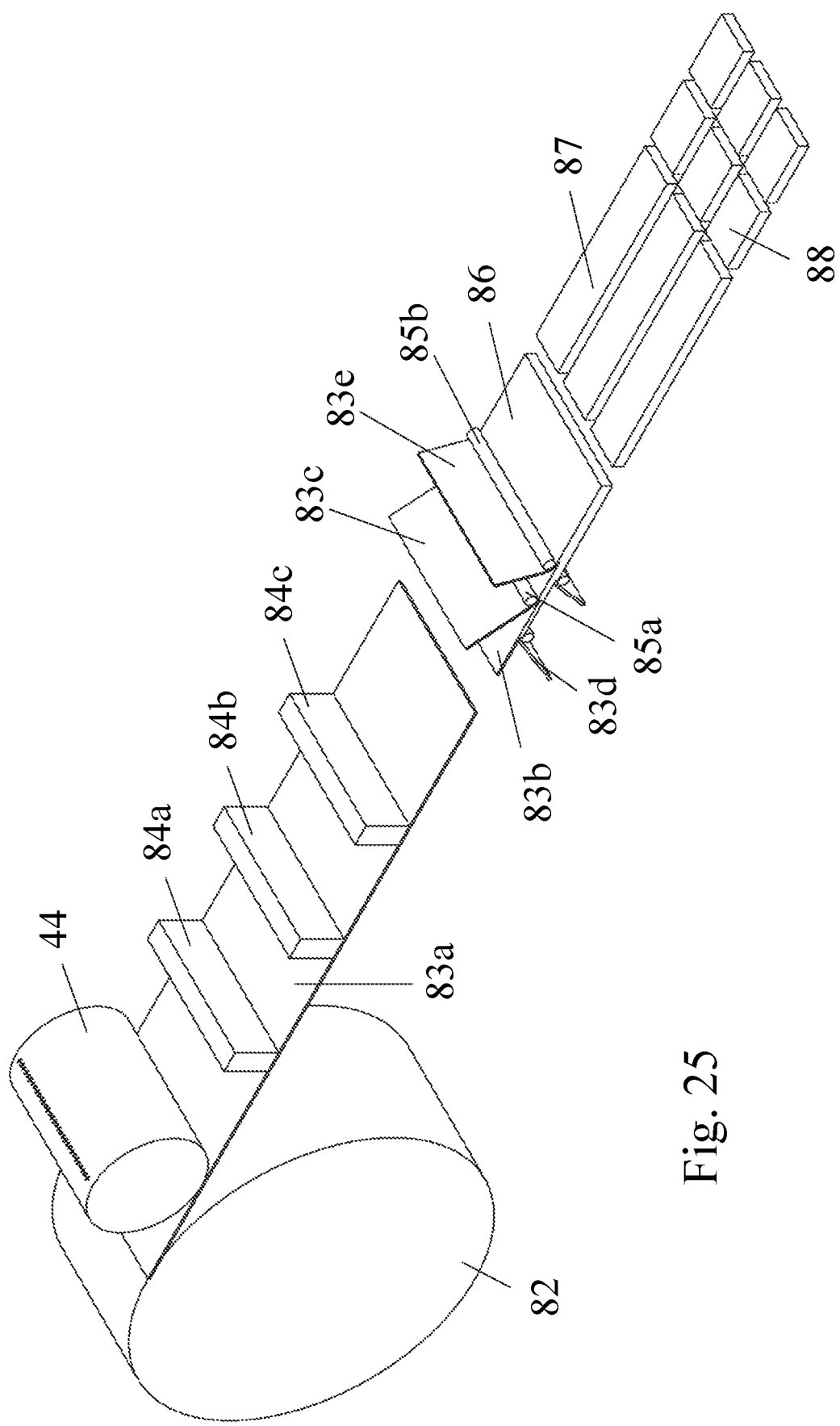

FIG. 25 shows an isometric view of a manufacturing method that can produce large quantities of element sheets stacked on top of each other at an affordable cost. A sheet heel 82 of thin plastic film, containing up to several kilometers of a continuous sheet 83a is unrolled to feed the machinery. The continuous sheet 83a is first perforated using the perforation drum 44 or other suitable method to produce orifices in the required locations. The continuous sheet 83a then passes through a series of work stations 84a, 84b, 84c, etc. where the other steps of the process are carried out.

In the printing process, work station 84a prints the terminals, work station 84b prints the selected pattern of thin lines and short thin lines, work station 84c dispenses the electrolyte and the glue strip.

In the photoresist process, work station 84a dispenses the photoresist, work station 84b sensitizes the photoresist using a cylindrical pattern mask as described in FIG. 6 or another suitable method. The work station 84c removes the areas of the photoresist and subsequent work stations (not drawn to avoid cluttering) dispense the ink, remove eventual ink spills, remove the remaining photoresist, dispense the electrolyte and the glue strip.

Several continuous sheets 83b, 83c, 83d, 83e, etc. under tension to allow the proper alignment of the terminals using guide rollers 85a, 85b, etc. are then pressed together and glued producing a stacked sheet 86. The stacked sheet 86 is cut first in the direction of the movement producing parallel width cut sheets 87 that are subsequently cut in the perpendicular direction of the movement producing length cut sheets 88 in the designed size. Depending on the sequence of the element sheets printed into the different continuous sheets, a variety of stacks can be produced.

FIG. 26 shows a front view of a parallel stack 89 that is composed of several element sheets 42a, 42b, 42c, etc. with identical nanolinear pattern designs or printed thin line and short thins line patterns and identical terminal configurations that have been made with terminals 60a, 60b, etc. on both sides of both extremities. The element sheets 42a, 42b, 42c, etc. with their corresponding printed layers 72a, 72b, etc. and their layers of electrolyte 63a, 63b, 63c, etc. are stacked on top of each other and each terminal on the top of an element sheet gets in contact with the corresponding terminal on the bottom of the next element sheet producing a set of terminal connections 93. The electrolyte applied to an element sheet is contained by the element sheet where the electrolyte has been applied and the next element sheet. A cover element 95 consisting of a element sheet with all terminals but no electrodes and no electrolyte is placed on the top to contain the electrolyte of the previous element sheet closing the parallel stack 89.

FIG. 27 shows a front view of a series stack 90 that is composed of several element sheets 42a, 42b, 42c, etc. with identical nanolinear pattern designs or printed thin line and short thins line patterns and identical terminal configurations that have been made with terminals 60a, 60b, etc. on both extremities on the top but only one extremity on the bottom 60c. The element sheets 42a, 42b, 42c, etc. with their corresponding printed layers 72a, 72b, etc. and their layers of electrolyte 63a, 63b, etc. are stacked on top of each other alternating the orientation so that the terminals 60c on the bottom are located on the left side in one layer and on the right side on the next layer of the stack. One terminal on every element sheet does not have a corresponding terminal on the bottom of the next element sheet and because the element sheet is made of a material that is not a conductor of electricity, a series gap 94 is produced. The terminal on the top of the next element sheet on the same side of the stack has a matching terminal on the bottom of the next element sheet producing a terminal connection 93. This arrangement alternates from left to right at each subsequent layer producing series connections of all element sheets on the series stack 90. The electrolyte applied to an element sheet is contained by the element sheet where the electrolyte has been applied and the next element sheet. The cover element 95 with terminals on the same side and on only one extremity on the top and on the bottom, and with no electrodes and no electrolyte is placed on the top of the stack to contain the electrolyte of the previous element sheet closing the series stack 90.

Figure 28:
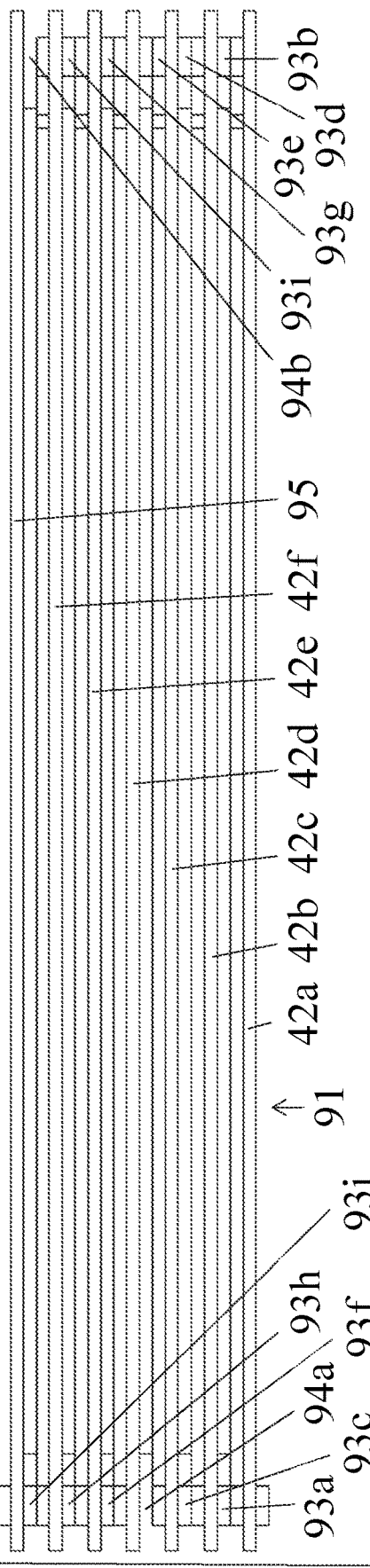

FIG. 28 shows front view of a 2 series 3 parallel stack 91 that is composed of element sheets with identical nanolinear pattern designs or printed thin line and short thins line patterns and different terminal configurations. The element sheets 42a, and 42d have been made with terminals on both extremities on the top but only one extremity on the bottom and are stacked at alternating orientations. The element sheets 42b, 42c, 42e, 42f have been made with terminals on both extremities on the top and on the bottom. The electrolyte applied to an element sheet is contained by the element sheet where the electrolyte has been applied and the next element sheet. The cover element 95 with terminals on the same side and on only one extremity on the top and on the bottom, and with no electrodes and no electrolyte is placed on the top of the stack to contain the electrolyte of the previous element sheet closing the 2 series 3 parallel stack 91.

The series gap 94a in the middle divides the 2 series 3 parallel stack 91 in two blocks, each made with three element sheets. The first block is made by element sheets 42a, 42b, and 42c connected by the terminal connections 93a, 93b, 93c, and 93d. The second block is made by element sheets 42d, 42e, and 42f connected by the terminal connections 93f, 93g, 93h, and 93i. The two blocks are connected in series by the terminal connection 93e. The terminal connections 93j makes the connection to the cover element 95 and the series gap 94b on the other side insulates the rest of the element sheets.

Figure 29:
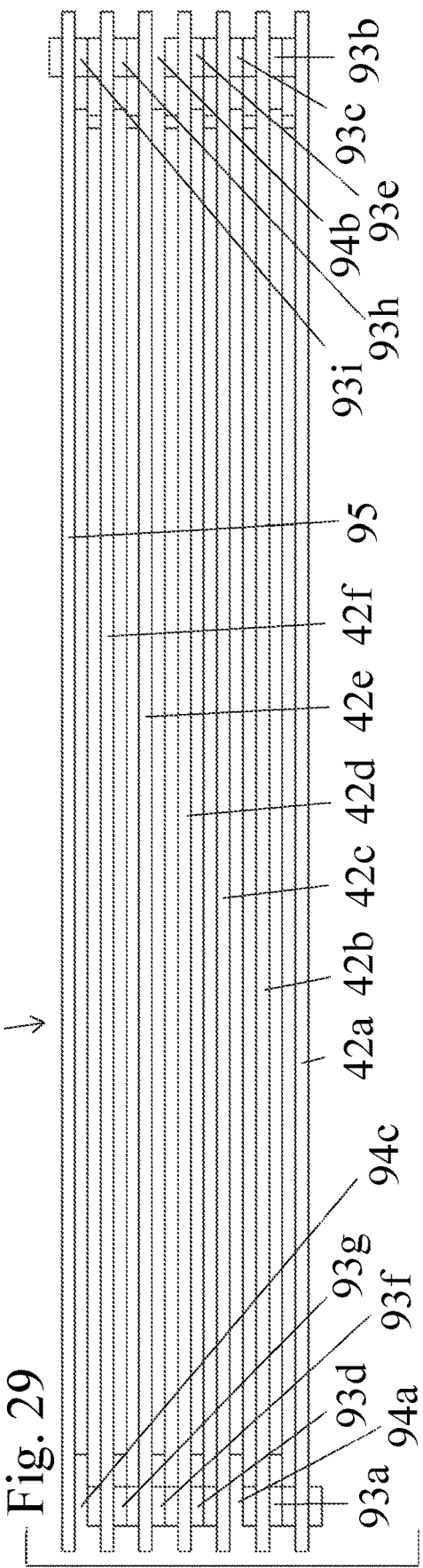

FIG. 29 shows front view of a 3 series 2 parallel stack 92 that is composed of element sheets with identical nanolinear pattern designs or printed thin line and short thins line patterns and different terminal configurations. The element sheets 42a, 42c, and 42e have been made with terminals on both extremities on the top but only one extremity on the bottom and are stacked at alternating orientations. The element sheets 42b, 42d, and 42f have been made with terminals on both extremities on the top and on the bottom. The electrolyte applied to an element sheet is contained by the element sheet where the electrolyte has been applied and the next element sheet. The cover element 95 with terminals on the same side and on only one extremity on the top and on the bottom, and with no electrodes and no electrolyte is placed on the top of the stack to contain the electrolyte of the previous element sheet closing the 3 series 2 parallel stack 92.

The series gaps 94a and 94b divide the 3 series 2 parallel stack 92 in three blocks, each made with two element sheets. The first block is made by element sheets 42a and 42b connected by the terminal connections 93a and 93b. The second block is made by element sheets 42c and 42d connected by the terminal connections 93d and 93e. The third block is made by element sheets 42e and 42f connected by the terminal connections 93g and 93h. The first and the second blocks are connected in series by the terminal connection 93c and the second and third blocks are connected in series by the terminal connection 93f. The terminal connections 93i makes the connection to the cover element 95 and the series gap 94c on the other side insulates the rest of the element sheets.

To implement a stack able to provide certain voltage and current, a suitable combination of element sheets can be used to produce any type of n by m stack where n blocks each made of m element sheets connected in parallel are connected in series.

FIG. 30 shows an exploded view of one embodiment of a supercapacitor composed of a case 98 that has two device terminals 99a and 99b and a stack of element sheets. In the case of FIG. 30 the supercapacitor is assembled with one parallel stack 89. An electrolyte seal 96 is made around the area covered by the electrolyte to prevent leaks and two terminal seals 97a and 97b are made to provide mechanical support, isolate the terminals 60a and 60b and improve contact among the several terminals in the individual element sheets. The electrolyte seal 96 and the terminal seals 97a and 97b can be made using a glue strip or by applying heat to the necessary spots in the element sheets to cause them to melt and fuse together. As the terminals 60a and 60b in both extremities of the parallel stack 89 are all connected, the device terminals 99a and 99b are constructed to go around the case 98 so they can make contact to the terminals at both sides of the case.

FIG. 31 shows the assembled supercapacitor of FIG. 30, composed of the case 98, two device terminals 99a and 99b and the parallel stack 89.

Detail FIG. 31A shows a device connection 100a between the topmost terminal 60a of the parallel stack and the device terminal 99a. The device connection 100a can in most applications be made just by contact, not requiring welding or complicated wiring, reducing manufacturing complexity and costs.

FIG. 32 shows another embodiment of an assembled supercapacitor, in this case based on one series stack 90. As the series stack 90 has terminals on both sides of only one extremity of the case 98, the device terminals 99a and 99b are made with a different design. The device terminals 99a and 99b are embedded in the case 98 one at each side of the case at the appropriate position to contact the terminals of the stack.

FIG. 32A shows the device connection 100a between the device terminal 99a and the terminal 60a of the series stack.

FIG. 33 shows another embodiment of an assembled supercapacitor, in this case based on one 2 series 3 parallel stack 91. A second alternative design for the device terminals 99a and 99b for stacks that have terminals on both sides of only one extremity of the case 98 such as the 2 series 3 parallel stack 91 is shown. The device terminals 99a and 99b are made shorter to be placed at the same extremity of the case 98 with some clearance between them.

Detail FIG. 33A shows the device connection 100a between the device terminal 99a and the terminal 60a of the 2 series 3 parallel stack.

Detail FIG. 33B shows that a device terminal bypass 101b allows the device terminal 99b to pass above the terminal 60a without touching it. The device terminal 99b and the terminal 60a are separated by the case wall.

FIG. 34 shows another embodiment of an assembled supercapacitor for stacks that have terminals on opposite extremities of the case 98 such as the parallel stack. The device terminals 99a and 99b are placed at opposite extremities at the appropriate places to connect the terminals of the stack.

Operation

FIG. 3 shows that as the perforation drum 44 rotates in the direction of the curved arrow, the element sheet 42 advances in synchronicity in the direction of the straight arrow, the perforation spikes 45a and 45b produce the orifices 43a and 43b in the intended positions in the element sheet.

FIG. 6 shows that as the cylindrical pattern mask 50 rotates in the direction of the curved arrow and the element sheet 42 advances in synchronicity in the direction of the straight arrow, the linear light source 52 produces a focused and collimated light of adequate wavelength that illuminates the cylindrical pattern mask 50 producing a dynamic image into the surface of the element sheet 42 sensitizing the photoresist. The mask gap 51 generates a gap between two consecutive element sheets so they can later on be cut apart. The process is repeated for both sides of the element sheet.

FIG. 25 shows the manufacturing method that can produce large quantities of element sheets stacked on top of each other at an affordable cost. The sheet heel 82 of thin plastic film, containing up to several kilometers of continuous sheet 83a is unrolled to feed the machinery. The continuous sheet 83a is first perforated using the perforation drum 44 or other suitable method to produce orifices in the required locations. The continuous sheet 83a then passes through a series of work stations 84a, 84b, 84c, etc. where the other steps of the process are carried out.

In the printing process, work station 84a prints the terminals, work station 84b prints the selected pattern of thin lines and short thin lines, work station 84c dispense the electrolyte and the glue strip.

In the photoresist process, work station 84a dispenses the photoresist, work station 84b sensitizes the photoresist using a cylindrical pattern mask as described in FIG. 6 or another suitable method. The work station 84c removes the areas of the photoresist and subsequent work stations (not drawn to avoid cluttering) dispense the ink, remove eventual ink spills, remove the remaining photoresist, dispense the electrolyte and the glue strip.

Several continuous sheets 83b, 83c, 83d, 83e, etc. under tension to allow the proper alignment of the terminals using guide rollers 85a, 85b, etc. are then pressed together and glued producing the stacked sheet 86. The stacked sheet 86 is cut first in the direction of the movement producing parallel width cut sheets 87 that are subsequently cut in the perpendicular direction of the movement producing length cut sheets 88 in the designed size. Depending on the sequence of the element sheets printed into the different continuous sheets, a variety of stacks can be produced.

Figure 35:
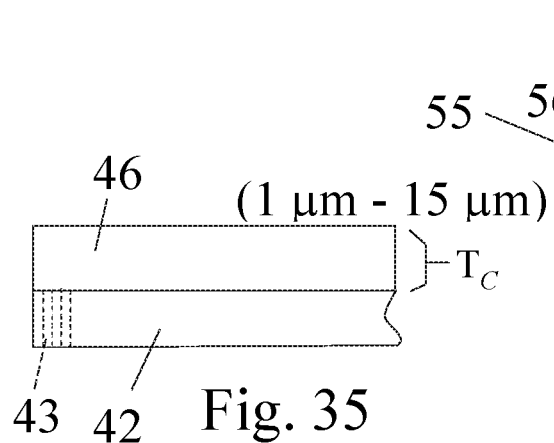

FIG. 35 shows a cross-sectional view of a portion of the element sheet 42 already perforated by orifices 43 that serves as a substrate for the photoresist 46. The photoresist 46 may be applied to the element sheet 42 through spin coating, spraying, roller coating, dip coating, extrusion coating or other similar process to spread the photoresist 46 evenly over the surface of the element sheet 42. The coating process may also optimize the thickness $T_C$ of the photoresist 46 to provide adequately dimensioned structural surfaces that form the physical barriers to contain the special graphene and/or carbon based inks. For example, using a roller coating process that is suitable to integrate in a process described in FIG. 25 the photoresist 46 may be spread using a roller that is kept at a constant distance from the element sheet 42 setting the thickness $T_C$ of the photoresist 46. The thickness $T_C$ of the photoresist 46 may in some embodiments be in a range of 1 μm-10 μm or in other ranges depending on the energy density and power density desired.

Figure 36:
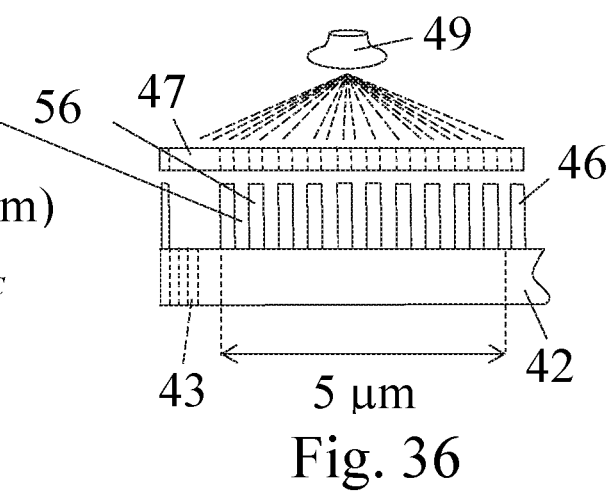

FIG. 36 shows a cross-section of a portion of a pattern mask 47 aligned over the photoresist 46 to expose partial areas of the photoresist 46 to the light source 49. A developer solution is applied to wash the exposed portions away from the photoresist 46 and leave a set of cavities 55 surrounded by physical barriers 56 and exposing the orifices 43.

Figure 37:
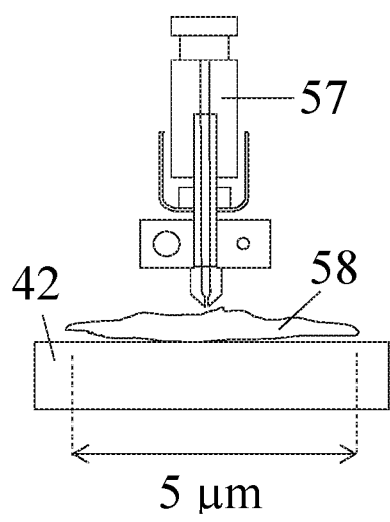

FIG. 37 illustrates the deposition of ink 58 from the printer head 57 that due to settling and splatter is generally greater than 5 μm depending upon the ink's composition and viscosity. Using the process of the present invention, the special ink 58 made of graphene, graphene oxide, activated carbon, carbon nanotubes or other mixtures are printed within the cavities formed by the physical barriers 56 of photoresist. As shown multiple cavities 55 may be formed within a very small area and within areas much smaller than the 5 μm minimally necessary for the deposition of ink 58 on an element sheet 42 having only a flat surface.

Figure 38:
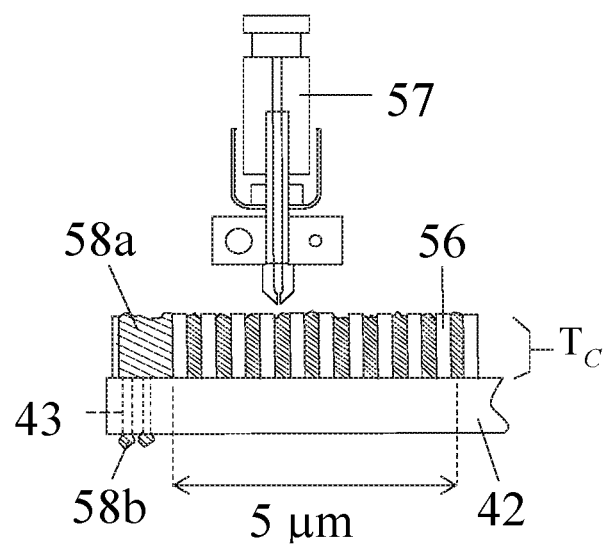

As shown in FIG. 38, the thickness $T_C$ of the photoresist layer 46 provides for ink 58a to fill or partially fill the cavities providing for increased amounts of ink 58a within very small areas increasing the surface area of the graphene and carbon components and thereby increasing energy storage. This allows the ink 58a to reach all spots intended to be covered without the risk of leaks or spills that could lead to short circuits. The deposited ink 58b flows through and fills the orifices 43 reaching the other side of the element sheet 42.

At this point in the process, the ink 58a, 58ba can be submitted to a curing process or be left to dry on its own before the physical barrier is removed. In some embodiments, the graphene and/or carbon based ink may be made with tiny particles using a binder of low viscosity or may be made with a binder that will not harden unless submitted to a suitable curing process to solidify the ink to form the pattern designs as described herein. In the event that the ink overflows the volume of the cavities 55 a process can be used to remove the excess ink without damaging the ink deposited inside the cavities as described in FIG. 12.

Figure 39:
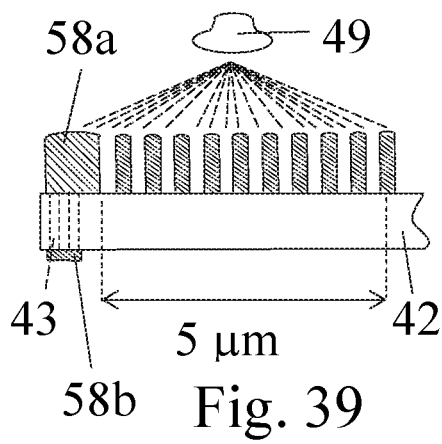

FIG. 39 illustrates that after the ink 58a, 58b has dried, a process step to expose the remaining areas of photoresist to the light source 49 is carried out so that all photoresist can be washed away from the element sheet 42.

Figure 40:
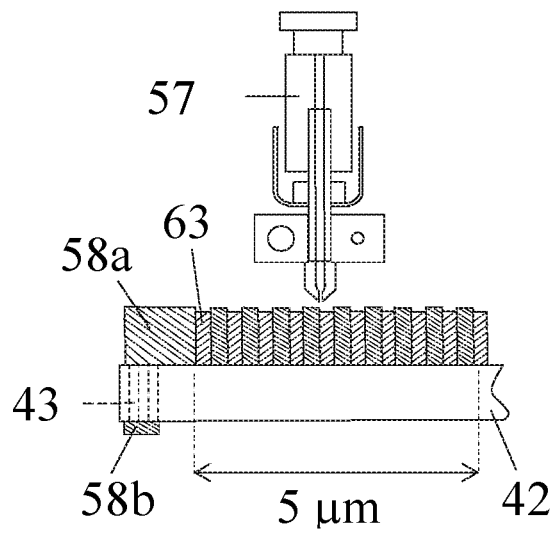

FIG. 40 illustrates a process step of printing the electrolyte 63 within the pattern designs formed from the graphene and/or carbon based ink 58a, 58b. The electrolyte 63 flows into the gaps left by the removed photoresist and can be sealed using a glue strip or by applying heat.

The individual element sheets of the supercapacitor are made and stacked according to the specified voltage and current ratings desired. To increase the current and the energy stored a block of element sheets stacked in parallel is used and to increase the voltage, identical blocks of one or more element sheets are stacked in series. The terminals are constructed to have a much larger size than the individual fringe to enable the individual element sheets to be easily stacked without the need to precisely align them, facilitating the construction of the devices and reducing costs. The larger size of the terminals also facilitates the conductance of large currents improving the maximum instantaneous power that a device is able to supply.

The operation of the supercapacitor is very simple and follows the standard practice of such devices. The supercapacitor can be charged and discharged using an appropriate circuit that ensures that the maximum current is not exceeded during charge or discharge.

CONCLUSION

A set of pattern designs to construct element sheets is proposed that facilitates the construction of supercapacitors using thin sheets that can be printed using graphene based inks. The proposed patterns are made mostly of parallel straight lines allowing the patterns to be aligned with the direction of the printing. This facilitates the deposition of the ink and reduces printing errors and costs.

The proposed patterns also contain terminals of a larger size compared to the other printed features on the element sheet that connect both sides of the element sheet through a series of connecting orifices. The terminals simplify the assembly of a stack of element sheets, necessary to achieve the desired voltage, current and charge ratings, enabling the individual printed sheets to be placed on top of each other without the need of individual welds, metallization or complicated process of alignment. The connections are made easily and reliably just by the placement of the individual sheets on the stack.

The electrolyte in the sheets can be sealed inside the stack with a glue strip or using a heat sealing process and the sealed stack can be simply placed inside a case without the need of welding unless a more demanding application requires a more stable connection.

The photoresist process allows the printing of very small structures using photoresist enabling the construction of devices with higher energy density without increasing the weight of the device.

The standard printing process allows the construction of cheaper devices than the ones produced with the photoresist process by using standard printing equipment albeit producing devices with smaller energy density.

The combination of more efficient designs, simpler assembly process and smaller structures produce better supercapacitor devices at affordable prices.

The invention has been described in detail with particular reference to certain preferred embodiments thereof, but it will be understood that variations and modifications can be effected within the spirit and scope of the invention.

What is claimed is:

1. A manufacturing process for the production of thin line supercapacitors having increased energy density, comprising:
    perforating a series of orifices on an element sheet;
    printing graphene ink on both sides of the element sheet filling the orifices to create terminals that connect both sides of the element sheet;
    printing graphene ink in a plurality of thin lines perpendicular to the terminals and along the direction of printing;
    printing electrolyte within the plurality of thin lines; and
    forming electrodes having minimal spacing between gaps to increase the energy density within the supercapacitors.

2. The manufacturing process for the production of thin line supercapacitors of claim 1 wherein the minimal gaps between printed features are between one and ten microns.

3. The manufacturing process for the production of thin line supercapacitors of claim 1 wherein the minimal gaps between printed features is between two hundred nano meters and one micron.

4. The manufacturing process for the production of thin line supercapacitors of claim 1 comprising printing short thin lines that are in parallel to the plurality of thin lines and that do not connect to the terminals thereby creating additional capacitors in series to increase voltage.

5. The manufacturing process for the production of thin line supercapacitors of claim 1 comprising replacing the graphene ink by an ink composed of a mixture selected from the group consisting of graphene, carbon nanotubes and activated carbon to increase the physical properties of the electrodes by increasing the number of pores into the electrodes thereby increasing the available surface area of the printed electrode and thereby increasing the capacitance and the energy density of the supercapacitor.

6. The manufacturing process for the production of thin line supercapacitors of claim 1 comprising a pattern design formed from the plurality of thin lines that maximizes the number of individual capacitors that can be printed within the element sheet.

7. The manufacturing process for the production of thin line supercapacitors of claim 1 comprising individual capacitors connected in parallel.

8. The manufacturing process for the production of thin line supercapacitors of claim 1 comprising individual capacitors connected in series.

9. The manufacturing process for the production of thin line supercapacitors of claim 1 comprising individual capacitors connected in series and parallel.

10. The manufacturing process for the production of thin line supercapacitors of claim 1 comprising stacking element sheets in parallel to increase the capacitance and the current of the supercapacitor.

11. The manufacturing process for the production of thin line supercapacitors of claim 1 comprising stacking element sheets in series to increase the voltage of the supercapacitor.

12. The manufacturing process for the production of thin line supercapacitors of claim 1 comprising stacking element sheets in series and parallel to increase the voltage, capacitance and current of the supercapacitor.

* * * * *